United States Patent
Hino et al.

(10) Patent No.: US 8,368,273 B2
(45) Date of Patent: Feb. 5, 2013

(54) ROTARY ELECTRIC MACHINE WITH AIR GAPS CONFIGURED TO CANCEL TORQUE PULSATIONS

(75) Inventors: Noriaki Hino, Mito (JP); Yutaka Matsunobu, Mito (JP); Shinji Sugimoto, Tokai (JP); Akinori Kamiya, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/548,447

(22) Filed: Jul. 13, 2012

(65) Prior Publication Data

US 2012/0274160 A1  Nov. 1, 2012

Related U.S. Application Data

(63) Continuation of application No. 12/389,233, filed on Feb. 19, 2009, now Pat. No. 8,247,940.

(30) Foreign Application Priority Data

Mar. 4, 2008 (JP) ................................. 2008-053572

(51) Int. Cl.
*H02K 21/12* (2006.01)
(52) U.S. Cl. ............................. 310/156.47; 310/156.53
(58) Field of Classification Search ............. 310/156.47, 310/156.53
See application file for complete search history.

(56) References Cited

U.S. PATENT DOCUMENTS

| | | | |
|---|---|---|---|
| 6,218,753 B1 | 4/2001 | Asano et al. | |
| 6,252,323 B1 | 6/2001 | Nishikawa et al. | |
| 6,597,079 B2 | 7/2003 | Miyashita et al. | |
| 6,906,442 B2 | 6/2005 | Yamaguchi | |
| 7,067,948 B2 * | 6/2006 | Yamaguchi et al. | 310/156.47 |
| 7,151,335 B2 | 12/2006 | Tajima et al. | |
| 7,327,062 B2 | 2/2008 | Kaneko | |
| 7,342,338 B2 * | 3/2008 | Miyazaki et al. | 310/156.47 |
| 7,928,622 B2 * | 4/2011 | Okubo | 310/156.47 |
| 8,040,010 B2 | 10/2011 | Kamiya et al. | |
| 2004/0124728 A1 * | 7/2004 | Yamaguchi et al. | 310/156.25 |
| 2005/0121990 A1 | 6/2005 | Kaneko | |
| 2006/0163969 A1 | 7/2006 | Nemoto et al. | |

(Continued)

FOREIGN PATENT DOCUMENTS

| | | | |
|---|---|---|---|
| JP | 2000-134841 A | 5/2000 | |
| JP | 2002-165394 A | 6/2002 | |

(Continued)

OTHER PUBLICATIONS

Japanese Office Action including English translation dated Mar. 9, 2010 (Fifteen (15) pages).

(Continued)

*Primary Examiner* — Hanh N Nguyen
(74) *Attorney, Agent, or Firm* — Crowell & Moring LLP

(57) ABSTRACT

A rotary electric machine includes a stator having stator windings; and a rotor rotatably disposed in the stator, said rotor having a rotor core provided with a plurality of magnets and a plurality of magnetic auxiliary salient poles formed between poles of the magnets. In this rotary electric machine: a magnetic air gap is provided in an axial direction of the rotor in a position shifted in a circumferential direction from a q axis passing through a center of the magnetic auxiliary salient pole within the magnetic auxiliary salient pole; and an amount of shifting the magnetic air gap from the q axis in the circumferential direction differs according to a position of the magnetic air gap in the axial direction so as to cancel torque pulsation in energization caused due to the magnetic air gap.

14 Claims, 32 Drawing Sheets

U.S. PATENT DOCUMENTS

| | | |
|---|---|---|
| 2008/0024028 A1 | 1/2008 | Islam et al. |
| 2009/0224627 A1 | 9/2009 | Hino et al. |
| 2009/0230802 A1 | 9/2009 | Kamiya et al. |
| 2010/0308680 A1 | 12/2010 | Yamada et al. |
| 2011/0254474 A1 | 10/2011 | Saito et al. |

FOREIGN PATENT DOCUMENTS

| | | |
|---|---|---|
| JP | 2004-32947 A | 1/2004 |
| JP | 2004-343886 A | 12/2004 |
| JP | 2005-176424 A | 6/2005 |
| JP | 2005-261024 A | 9/2005 |
| JP | 2005-354899 A | 12/2005 |
| JP | 2006-60952 A | 3/2006 |
| JP | 2006-115613 A | 4/2006 |
| JP | 2007-166802 A | 6/2007 |

OTHER PUBLICATIONS

Japanese Office Action including English translation dated Aug. 24, 2010 (Ten (10) pages).

* cited by examiner

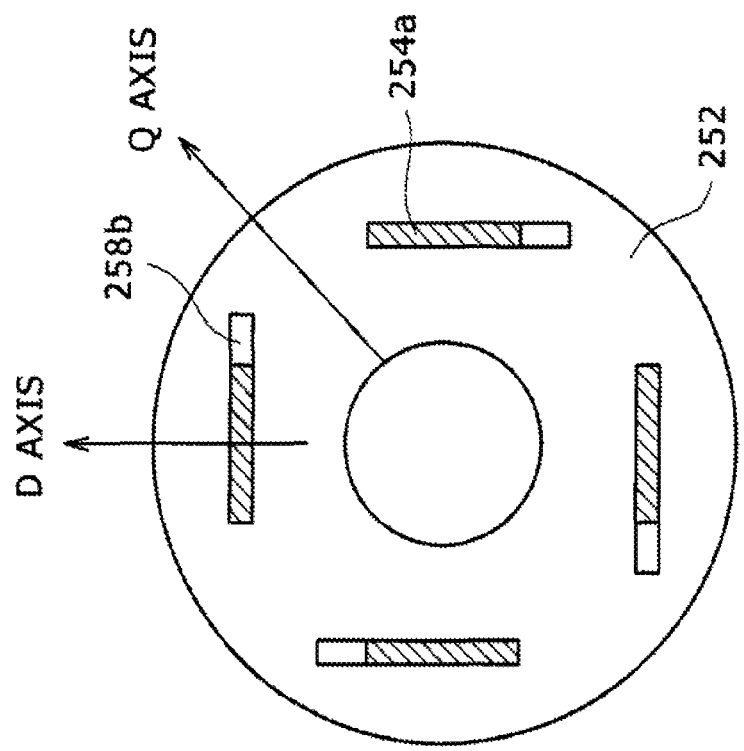
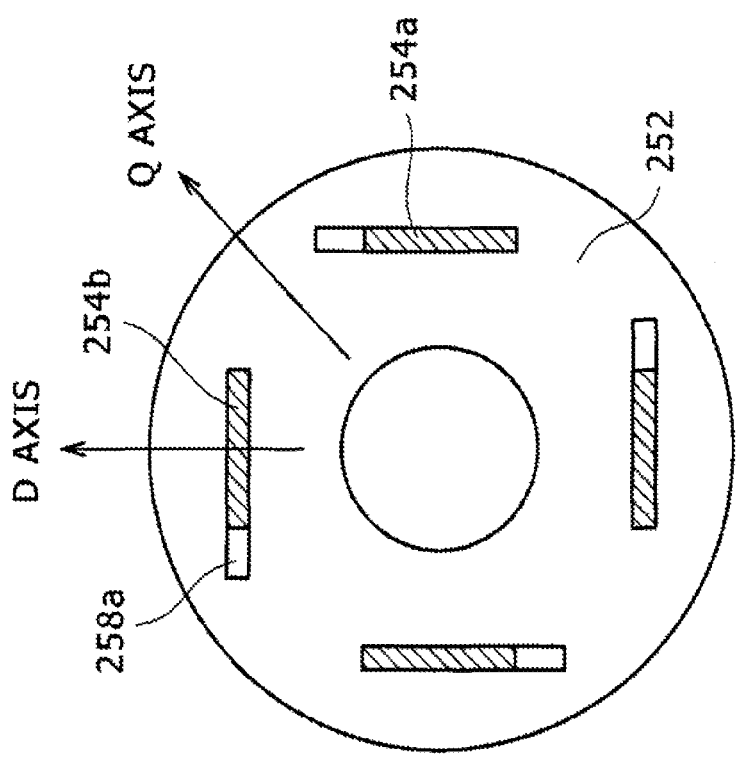
FIG. 22A
FIG. 22B

ROTARY ELECTRIC MACHINE WITH AIR GAPS CONFIGURED TO CANCEL TORQUE PULSATIONS

This application is a continuation of U.S. patent application Ser. No. 12/389,233, filed Feb. 19, 2009, which in turn claims the priority of Japanese application JP 2008-053572 filed on Mar. 4, 2008. The entire disclosure of each of the above-identified applications is incorporated herein by reference.

BACKGROUND OF THE INVENTION

1. Field of the Invention

The present invention relates to a rotary electric machine, and an electric vehicle including the same.

2. Description of the Related Art

Drive motors used for electric vehicles or hybrid vehicles are required to output large power. Thus, permanent magnet type motors using a sintered magnet made of rare earth material for holding large energy is generally used. An embedded magnet type motor among the permanent magnet type motors is used as the drive motor which can satisfy requirements, including low-speed and large-torque output, and a wide range of rotation speeds.

Torque pulsation of the motor causes noise or vibration. In particular, the torque pulsation on the low-speed side of the electric vehicle disadvantageously deteriorates ride quality. In a conventional motor, a permanent magnet is generally skewed so as to reduce cogging torque. Instead of skewing the permanent magnet, JP-A-2005-176424 has proposed that a rotary electric machine is provided with slots on the outer peripheral side of the embedded magnet or the outer peripheral surface of a pole piece so as to reduce the cogging torque such that the slot is formed to be shifted in the direction of rotation as viewed from the direction of a rotation axis.

The occurrence of torque pulsation in a rotary electric machine is caused by the cogging torque due to a magnetic circuit for allowing a magnetic flux generated from a permanent magnet provided in a rotor to pass through a stator and then to return to the rotor again, and by a rotating magnetic flux generated by a current of the stator. The above-mentioned JP-A-176424/2005 relates to a technique for reducing the cogging torque as mentioned above.

The invention is directed to reduction of the pulsation due to the rotating magnetic flux generated by the stator current as mentioned above.

When the method disclosed in the above-mentioned JP-A-176424/2005 is intended to be used for reducing torque pulsation due to the stator current, which is to be solved by the invention, the appropriate reduction of the cogging torque becomes very difficult. That is, the method disclosed in JP-A-176424/2005 is designed to reduce the cogging torque. When the concept of this method is intended to be further applied so as to reduce the torque pulsation due to the stator current, the inherent cogging torque cannot be appropriately reduced.

General techniques proposed for reducing torque pulsation have the same influence on both of the cogging torque and the torque pulsation due to the stator current. As a result, in order to reduce both torque pulsations, it is necessary to handle the rotary electric machine taking into consideration the influence on both. This makes it difficult to easily solve both pulsations.

The inventors have thought that the entire torque pulsation can be more easily reduced and adjusted if the torque pulsation due to the stator current can be reduced by a structure or way which has little influence on the cogging torque. For example, when the cogging torque can be reduced and additionally the torque pulsation due to the stator current can also be reduced, the entire torque pulsation can be easily reduced.

SUMMARY OF THE INVENTION

Accordingly, it is an object of the invention to provide a technique which can reduce the torque pulsation due to the stator current by a way or structure which has little influence on the cogging toque.

In order to achieve the object described above, according to a first aspect of the present invention, there is provided a rotary electric machine including: a stator having stator windings; and a rotor rotatably disposed in the stator, said rotor having a rotor core provided with a plurality of magnets and a plurality of magnetic auxiliary salient poles formed between poles of the magnets, wherein a magnetic air gap is provided in an axial direction of the rotor in a position shifted in a circumferential direction from a q axis passing through a center of the magnetic auxiliary salient pole within the magnetic auxiliary salient pole, and wherein an amount of shifting the magnetic air gap from the q axis in the circumferential direction differs according to a position of the magnetic air gap in the axial direction so as to cancel torque pulsation in energization caused due to the magnetic air gap.

It is preferable that circumferential positions of the magnets in the rotor core are constant regardless of the axial positions of the magnets.

Further, it is preferable that the rotor core is divided into a plurality of division cores provided in the axial direction, each of said division cores having the magnet, the magnet auxiliary salient pole, and the magnetic air gap, and that the circumferential positions of the magnets in the division cores are constant regardless of the axial positions of the magnets.

Further, it is preferable that the rotary electric machine further includes a plurality of core groups, said core group including division cores having the magnetic air gaps located substantially in the same respective circumferential positions, and that the total thicknesses in the axial direction of the respective core groups are substantially the same.

Further, it is preferable that the rotary electric machine further includes two core groups with the magnetic air gaps located in different respective circumferential positions, and that phases of torque pulsations generated by the respective two core groups are shifted by 15 degrees or 30 degrees in terms of electrical angle.

Further, it is preferable that the rotary electric machine further includes first, second, and third core groups with the magnetic air gaps located in different respective circumferential positions, and that phases of torque pulsations respectively generated by the first, second, and third core groups are shifted by 10 degrees or 20 degrees in terms of electrical angle between the first core group and the second core group, and between the second core group and the third core group, respectively.

Further, it is preferable that the magnetic air gap is a concave portion formed at the surface of the rotor core, or a hole formed in the rotary core.

Further, it is preferable that a circumferential angle of the concave portion is set equal to or less than one half a peripheral length of an auxiliary salient pole.

Further, it is preferable that the hole serving as the magnetic air gap is integrally formed with a hole having the magnet provided therein.

Further, it is preferable that the plurality of magnets each of whose magnetization directions is a radial direction of the rotor core are arranged in the circumferential direction such that the magnetization directions are alternately reversed.

Further, it is preferable that the respective magnets constitute a magnet group including a plurality of magnets whose magnetization directions are substantially equal.

Further, it is preferable that the magnetic auxiliary salient poles are provided with a plurality of the magnet air gaps.

Further, it is preferable that the rotor core is formed by laminating electromagnetic steel plates, each plate having a hole or a cutout formed therein for forming the magnetic air gap.

Further, it is preferable that the two types of magnetic air gaps located in different circumferential positions are formed in the rotor core by laminating one steel plate on another steel plate turned upside down.

According to a second aspect of the present invention, there is provided an electric vehicle including: the rotary electric machine according to the first aspect; a battery for supplying a direct-current power; and a converter for converting the direct-current power of the battery into an alternating-current power, and supplying the alternating-current power to the rotary electric machine, wherein the electric vehicle is traveled by a drive force of the rotary electric machine.

According to the configuration of the present invention, the torque pulsation caused in relation to the stator current supplied to a stator winding can be reduced by the way or structure which has little influence on the cogging torque.

BRIEF DESCRIPTION OF THE DRAWINGS

The invention is further described with reference to the accompanying drawings in which:

FIG. 22A is a sectional view of the rotor 250 according to a second embodiment, taken along the line A-A;

FIG. 22B is a sectional view of the rotor 250 according to the second embodiment, taken along the line B-B;

DETAILED DESCRIPTION OF THE PREFERRED EMBODIMENTS

Figure 1:
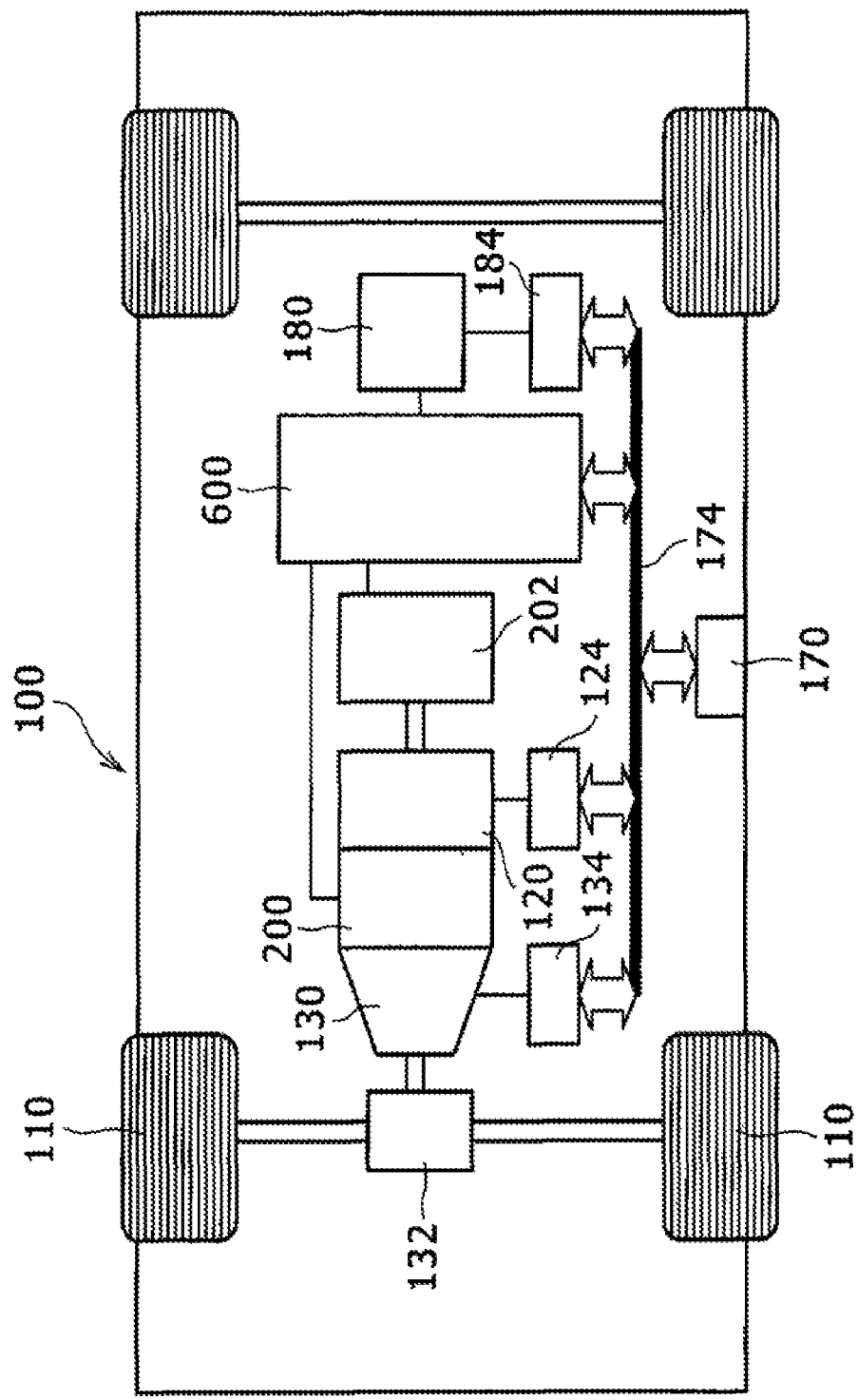
FIG. 1 is a diagram showing a schematic construction of a hybrid electric vehicle equipped with a rotary electric machine according to one embodiment of the invention.

The following embodiments can solve not only the problems associated with the above-mentioned object of the invention, but also other problems. Now, the representative problems to be solved by the embodiments, some of which are the same as those associated with the object of the invention, and a basic structure in relation to the solving of the problems will be described below.

(Good Torque Properties as Drive Rotary Electric Machine for Vehicle)

A rotary electric machine for driving a vehicle is required to output high torque in a start state of rotation or in a low-speed rotation region. Further, the torque output is also required even in a high-speed rotation region of the rotary electric machine. For example, the torque output is apparently necessary at 6000 rpm or more. The torque output is required at 10000 rpm or more. The electric motor which can be used at 12000 rpm makes the driving of the vehicle more preferable.

When the torque output in the low speed rotation region including the rotation start state is intended to be generated by magnet torque of a permanent magnet, the amount of use of the magnet becomes large. Further, an induced voltage induced based on the magnetic flux generated by the permanent magnet in the high-speed rotation region becomes high, which makes it difficult to supply the power to the rotary electric machine and thus needs a very high power supply voltage. That is, it is difficult to greatly increase the power supply voltage. This makes it difficult to obtain the torque output in a relatively high-speed rotation region, for example, at 6000 rpm or more.

In the embodiment to be described later, when the axis of the permanent magnet is set as the d axis, a magnetic resistance in the q-axis direction is made small, which generates large reluctance torque. The required torque consists of both magnet torque and reluctance torque, so that the ratio of the magnet torque to the required torque can be small. For example, when about 30 to 50% or more, or about 55% of the required torque can be the reluctance torque, the magnet torque can be reduced by a degree corresponding to the ratio, which can decrease the amount of permanent magnet material. Thus, the induced voltage by the permanent magnet in the high speed rotation can be decreased, which facilitates supply of the power from an inverter even in the high speed rotation, and can generate rotary torque even in the high speed rotation. The rotary electric machines of the following embodiments have a structure which can effectively generate the reluctance torque, and thus can output the rotary torque even in the above high-speed rotation region as well as the large rotary torque in the low-speed rotation region.

The rotation region capable of driving a vehicle is widened, whereby, for example, a hybrid vehicle having a narrow rotation region owned by an engine can be driven well, which leads to improvement of the fuel efficiency of the vehicle. Further, the decrease in amount of permanent magnet material can reduce no-load loss of the rotary electric machine, leading to improvement of efficiency of traveling of the vehicle.

(Downsizing)

The drive rotary electric machine for a vehicle is desired to have its volume downsized in addition to having the above torque properties. In this embodiment, the number of magnetic poles of the rotor is equal to or more than eight, which is advantageous in downsizing and high output. Since the number of the magnetic poles of the rotor is equal to or more than eight, a magnetic circuit generated in the stator tends to be formed near a portion of a stator core near the rotor. Thus, the length of the stator core in the radial direction thereof can be reduced. This decreases the length of the stator in the radial direction, that is, the dimension in the radial direction through the center axis of a section perpendicular to a rotary shaft.

(Reduction of Pulsation)

The reduction of torque pulsation has been described in the above-mentioned paragraphs of the effect of the invention and the problems to be solved by the invention. The reduction of torque pulsation performed by the following embodiments will be described specifically below. The embodiments to be described later can respectively reduce the cogging torque and the torque pulsation due to the stator current.

(1) Reduction of Cogging Torque

In a structure having a permanent magnet embedded in a rotary core, a magnetic flux density in the direction of rotation of a gap between a rotor and a stator tends to drastically change at an end of the permanent magnet in the rotation direction (which can also be described as "an end in the circumferential direction"), which may cause cogging torque. In the following embodiments, a magnetic air gap 257 is provided at an end of the permanent magnet corresponding to an end of a rotor magnetic pole (field pole) formed by the permanent magnet. The magnetic air gap 257 can reduce a drastic change in magnetic flux density of a gap between the above rotor and stator in the rotation direction. The magnetic air gap 257 can have an effect of decreasing the cogging torque.

(2) Reduction of Pulsation Due to Stator Current

In the following embodiments, a magnetic air gap 258 is formed in an auxiliary magnetic pole (auxiliary salient pole 259) for forming a magnetic circuit on the q axis. The positions of the magnetic air gaps 258 are changed in the rotation direction as viewed along the direction of a rotary shaft. Such an arrangement can reduce the pulsation due to the stator current.

(3) Reduction of Pulsation Due to Stator Current by Structure Having Little Influence on Cogging Torque The conventional technique of reducing the torque pulsation has influences on both the cogging torque and the pulsation due to the stator current. When the cogging torque is intended to be reduced, the effect of reducing the pulsation due to the stator current becomes insufficient, or too sufficient. Thus, it is necessary to find out such conditions that can reduce both torque pulsations by repeating experiments. That is, even when an optimal condition for reducing the pulsation due to the stator current is found out, the condition is not always preferable for reduction of the cogging torque, and may be undesired one in many cases. Thus, it is very difficult to find a condition that can reduce both torque pulsations. Even if the preferable condition is found out, the condition tends to change depending on various factors. Every time a new rotary electric machine is designed, the experiment needs to be repeated. The solving means described in the above paragraph (2) has very little influence on the cogging torque. When a condition for reduction of the pulsation due to the stator current is adjusted, the adjustment cannot deteriorate the state of the cogging torque. This reduces the torque pulsation very easily.

(Improvement of Efficiency of Rotary Electric Machine)

In the embodiment to be described below, the length of a magnetic bridge can be increased, which can reduce a leakage magnetic flux of the permanent magnet, leading to improvement of the efficiency of the rotary electric motor. The magnetic bridges can be formed along the magnetic air gaps 257 or slots 282 provided on both ends of the field pole, thereby preventing the concentration of stress, resulting in a decreased sectional area of the magnetic flux, which leads to improvement of the efficiency.

(Improvement of Productivity)

The external appearance of the rotary electric machine in an embodiment to be described later can be produced by punching using a silicon steel plate. Thus, the embodiment has excellent productivity. A core 301 has the shape symmetric with respect to that of the core 302 as will be described later. One silicon steel plate subjected to punching can be turned upside down to be used as the other core. As a result, the number of types of cores to be produced can be decreased to improve the productivity.

In the embodiments to be described, magnets introduced into the rotary electric machine along the axial direction of the rotor are disposed without being shifted in the circumferential direction, or are hardly displaced in the circumferential direction, which facilitates a magnetization work, thereby improving productivity. As will be described later, the permanent magnet may be magnetized, and then embedded in the rotor core. Alternatively, the permanent magnet may be inserted into the rotary core before being magnetized, and then magnetized by applying a strong magnetic field to the magnet. The latter does not interrupt an insertion work of the magnets because of an attraction force of the magnets in insertion of the magnets, and can suppress adhesion of contaminant or the like, thereby further improving the productivity. In employing such a magnetization method, when the magnet is axially divided into parts shifted from each other in the circumferential direction, each magnet part divided may be separately magnetized so as to improve magnetization properties. In the embodiment described later, the magnet is not divided in the axial direction, or the number of division of the magnet is small, which can reduce the number of repeating of the magnetization work, thereby improving the productivity. In the case of magnetizing a magnet extending in the axial direction at one time, nonuniform magnetization hardly occurs due to an influence, such as a difference in distance up to a magnetization device, and can improve the magnet properties and productivity as compared to the case in which the magnet is axially divided to be shifted from each other in the circumferential direction.

Now, preferred embodiments for implementing the invention will be described below with reference to the accompanying drawings. The rotary electric machine of the invention can respectively reduce the cogging torque in non-energization and the torque pulsation in energization, thereby achieving reduction in size, cost, and torque pulsation as will be described later. Thus, for example, the rotary electric machine is suitable for use as a motor for traveling an electric vehicle. The rotary electric machine of the invention can provide an electric vehicle having low vibration, low noise, and good ride quality. The rotary electric machine of the invention can be applied to a pure electric vehicle which is run only by the rotary electric machine, and a hybrid electric vehicle driven by both the engine and the rotary electric machine. Now, the hybrid electric vehicle will be described as one example.

First Embodiment

FIG. 1 is a diagram showing a schematic construction of a hybrid electric vehicle equipped with the rotary electric machine according to one embodiment of the invention. A vehicle 100 is equipped with an engine 120, a first rotary electric machine 200, a second rotary electric machine 202, and a battery 180. The battery 180 supplies direct-current power to a power converter (inverter) 600 for driving the rotary electric machines 200 and 202 when driving forces for the machines 200 and 202 are necessary. The power converter 600 converts the direct-current power into alternating-current power, and respectively supplies the converted alternating-current power to the rotary electric machines 200 and 202. In regeneration traveling, the rotary electric machines 200 and 202 generate alternating-current power based on kinetic energy of the vehicle to supply the power to the power converter 600. The power converter 600 converts the alternating-current power into direct-current power to supply the direct-current power to the battery 810. A battery (not shown) for supplying low-voltage power (for example, 14 volt power) is mounted on the vehicle, and thus the direct-current power of a constant voltage is supplied to a control circuit to be described later.

The rotary torques of the engine 120 and the rotary electric machines 200 and 202 are transferred to front wheels 110 via a transmission 130, and a differential gear 132. The transmission 130 is controlled by a transmission controller 134, and the engine 120 is controlled by an engine controller 124. The battery 180 is controlled by a battery controller 184. The transmission controller 134, the engine controller 124, the battery controller 184, the power converter 600, and an integrated controller 170 are connected to one another via a communication line 174.

The integrated controller 170 receives information about states of respective low-level controllers with respect to the integrated controller 170, that is, the transmission controller 134, the engine controller 124, the power converter 600, and the battery controller 184, from these controllers via the communication line 174. The integrated controller 170 computes a control command of each controller based on such information. The control command computed is transmitted to the corresponding controller via the communication line 174.

The battery 180 having a high voltage is constructed of a secondary battery, such as a lithium ion battery or a nickel hydride battery, and outputs a direct-current power of high voltage of 250 to 600 volts or more. The battery controller 184 outputs information about a discharge state of the battery 118 and a state of each unit cell constituting the battery 18 to the integrated controller 170 via the communication line 174.

The integrated controller 170 gives an instruction of a power generating operation to the power converter 600 when the charging of the battery 180 is determined to be necessary based on the information from the battery controller 184. The integrated controller 170 mainly manages output torques of the engine 120 and the rotary electric machines 200 and 202, computes a total torque of the output torque of the engine 120 and the output torques of the rotary electric machines 200 and 202, or a torque distribution ratio between these torques, and transmits control commands to the transmission controller 134, the engine controller 124, and the power converter 600 based on the result of the computation. The power converter 600 controls the rotary electric machines 200 and 202 so as to provide the torque output or generated power based on a torque command from the integrated controller 170 according to the command.

The power converter 600 is provided with a power semiconductor constituting an inverter so as to drive the rotary electric machines 200 and 202. The power converter 600 controls a switching operation of the power semiconductor based on the command from the integrated controller 170. Such a switching operation of the power semiconductor causes the rotary electric machines 200 and 202 to be driven as an electric motor or a generator.

When the rotary electric machines 200 and 202 are operated as an electric motor, the direct-current power from the high-voltage battery 180 is supplied to a direct-current terminal of the inverter of the power converter 600. The power converter 600 controls the switching operation of the power semiconductor to convert the supplied direct-current power into a three-phase alternating-current power, and then to supply the alternating-current power to the rotary electric machines 200 and 202. On the other hand, when the rotary electric machines 200 and 202 are operated as the generator, the rotors of the rotary electric machines 200 and 202 are rotatably driven by rotary torque added from the outside, whereby the three-phase alternating-current power is generated in stator windings of the rotary electric machines 200 and 202. The generated three-phase alternating-current power is converted into direct-current power by the power converter 600, and the direct-current power is supplied to the high-voltage battery 180, so that the battery is charged.

The rotary electric machine 200 and the rotary electric machine 202 are independently controlled. For example, when the rotary electric machine 200 is operated as the electric motor, the rotary electric machine 202 can be operated as the electric motor, and also as the generator, and further can be stopped. It is apparent that the opposite is also true. The integrated controller 170 determines in which mode each of the rotary electric machines 200 and 202 is operated, and gives a command to the power converter 600. Based on the command, the power converter 600 is in an operating mode of the electric motor, or in an operating mode of the generator, or in a stopped mode of operation.

Figure 2:
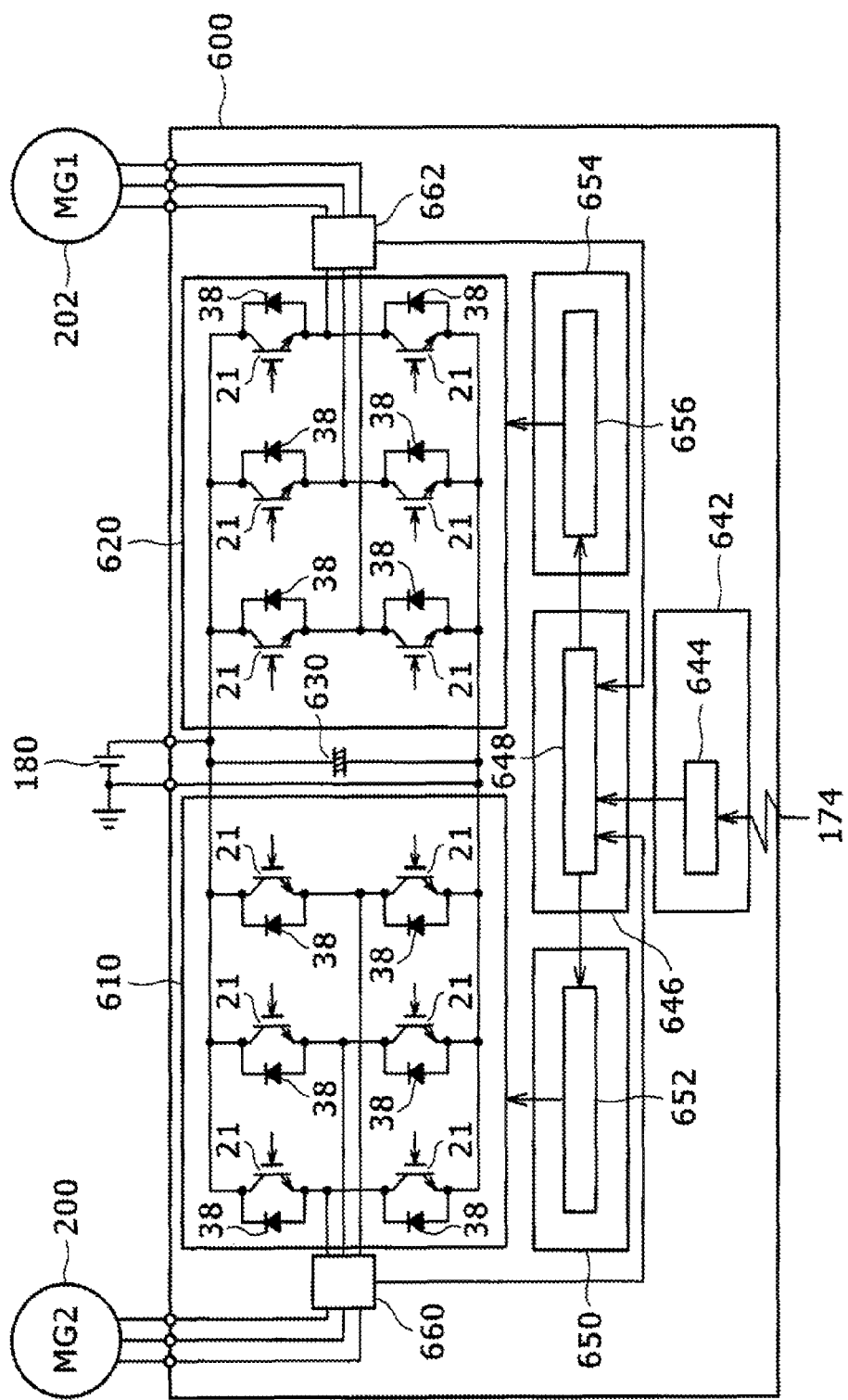
FIG. 2 is a circuit diagram of a power converter 600.

FIG. 2 schematically shows a circuit diagram of the power converter 600 shown in FIG. 1. The power converter 600 is provided with a first inverter for the rotary electric machine 200 and a second inverter for the rotary electric machine 202. The first inverter includes a power module 610, a first drive circuit 652 for controlling a switching operation of each power semiconductor 21 of the power module 610, and a current sensor 660 for detecting a current of the rotary electric machine 200. The drive circuit 652 is provided in a drive circuit substrate 650. On the other hand, the second inverter includes a power module 620, a second drive circuit 656 for controlling a switching operation of each power semiconductor 21 of the power module 620, and a current sensor 662 for detecting a current of the rotary electric machine 202. The drive circuit 656 is provided in a drive circuit substrate 654. The control circuit 648 provided in a control circuit substrate 646, a condenser module 630, and a transmitting and receiving circuit 644 mounted on a connector substrate 642 are commonly shared between the first inverter and the second inverter.

The power modules 610 and 620 are operated according to drive signals output from the respective drive circuits 652 and 656. The power modules 610 and 620 respectively convert direct-current power supplied from the battery 180 into three-phase alternating-current power, and supply the power to the stator windings, which are armature windings of the respective rotary electric machines 200 and 202. The power modules 610 and 620 converts alternating-current power induced in the stator windings of the rotary electric machines 200 and 202 into direct current, and supplies the direct current to the high-voltage battery 180.

The power modules 610 and 620 include three-phase bridge circuits as shown in FIG. 2, and series circuits corresponding to the three-phase circuits are electrically connected in parallel between a positive electrode and a negative electrode of the battery 180. Each series circuit includes a power semiconductor 21 constituting an upper arm and a power semiconductor 21 constituting a lower arm. These power semiconductors 21 are connected in series to each other. The power module 610 and the power module 620 have substantially the same circuit configuration as shown in FIG. 2. Here, the power module 610 will be described below as a representative.

In this embodiment, an insulated gate bipolar transistor (IGBT) 21 is used as a power semiconductor element for switching. The IGBT21 includes three electrodes, namely, a collector electrode, an emitter electrode, and a gate electrode. A diode 38 is electrically connected to between the collector electrode and the emitter electrode of the IGBT 21. The diode 38 includes two electrodes, namely, a cathode electrode and an anode electrode. The cathode electrode is electrically connected to the collector electrode of the IGBT 21 and the anode electrode is electrically connected to the emitter electrode of the IGBT 21 such that a direction from the emitter electrode to the collector electrode of the IGBT 21 is the forward direction.

A metal-oxide semiconductor field-effect transistor (MOSFET) may be used as a power semiconductor element for switching. The MOSFET has three electrodes, namely, a drain electrode, a source electrode, and a gate electrode. The MOSFET has a parasitic diode between the source electrode and the drain electrode such that the direction from the drain electrode to the source electrode is the forward direction, and thus does not need to have the diode 38 shown in FIG. 2.

The arm of each phase is constructed by electrically connecting the source electrode of the IGBT21 to the drain electrode of the IGBT21 in series. Although only one IGBT of each of the upper and lower arms of the respective phases is shown in this embodiment, a plurality of IGBTs are electrically connected in fact in parallel because a current capacity to be controlled is large. For simplification, one power semiconductor will be described below.

In an example shown in FIG. 2, each of the upper and lower arms of the respective phases is constructed of three IGBTs. The drain electrode of the IGBT21 of each upper arm of each phase is electrically connected to the positive electrode of the battery 180, and the source electrode of the IGBT21 of each lower arm of each phase is electrically connected to the negative electrode of the battery 180. An intermediate point of each arm of the phase (a connection portion between the source electrode of the IGBT on the upper arm side and the drain electrode of the IGBT on the lower arm side) is electrically connected to an armature winding (stator winding) of the corresponding phase of each of the rotary electric machines 200 and 202.

Drive circuits 652 and 656 constitutes drive units for controlling the respective inverters 610 and 620, and generate drive signals for driving the IBGTs 21 based on a control signal output from the control circuit 648. The drive signals generated by the drive circuits 652 and 656 are respectively output to the gates of the respective power semiconductor elements of the power modules 610 and 620. Each of the drive circuits 652 and 656 is provided with six integrated circuits for generating the drive signal to be supplied to the gate of each of the upper and lower arms of each phase. The six integrated circuits are constructed as one block.

A control circuit 648 constitutes a controller for each of the inverters 610 and 620. The control circuit 648 is constructed of a microcomputer for computing a control signal (control value) for operating (turning on and off) the power semiconductor elements for switching. The control circuit 648 receives inputs of a torque command signal (torque command value) from a high-level controller, sensor outputs from the electric current sensors 660 and 662, and sensor outputs from the rotary sensors mounted on the rotary electric machines 200 and 202. The control circuit 648 computes the control value based on the input signals, and outputs control signals for controlling switching timing of the drive circuits 652 and 656.

The transmitting and receiving circuit 644 mounted on the connector substrate 642 is to electrically connect the power converter 600 to the external controller, and transmits and receives information with another device via the communication line 174 shown in FIG. 1. The condenser module 630 constitutes a smoothing circuit for suppressing variations in direct-current voltage generated by the switching operation of the IGBT 21. The condenser 630 is electrically connected in parallel to terminals on the direct-current side of the first and second power modules 610 and 620.

Figure 3:
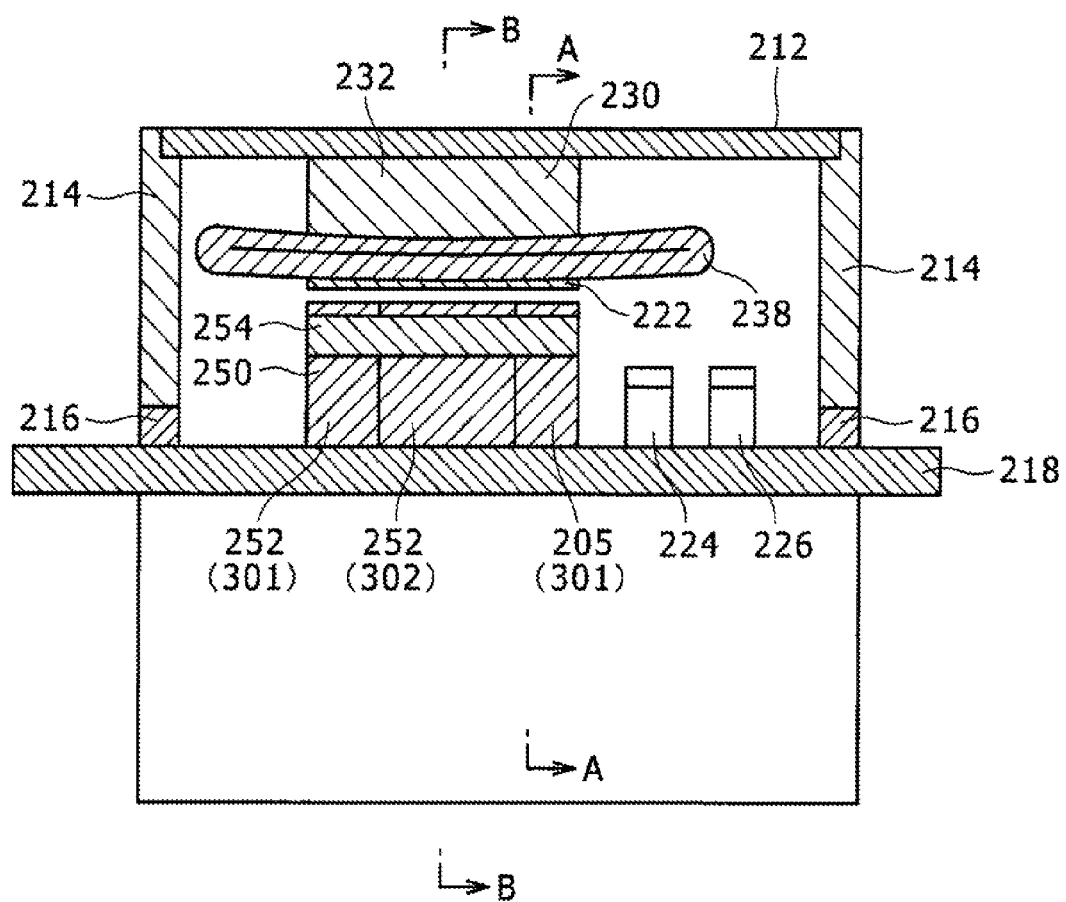
FIG. 3 is a sectional view of the rotary electric machine according to the embodiment.

FIG. 3 is a sectional view of the rotary electric machine 200 or 202 shown in FIG. 1. The rotary electric motor 200 has substantially the same structure as that of the rotary electric motor 202. Now, the structure of the rotary electric machine 200 will be described below as the representative. The structure to be described later does not need to be used in both rotary electric machines 200 and 202, and thus may be used in at least one of them.

A stator 230 is held in the housing 212, and includes a stator core 232 and stator windings 238. A rotor 250 is rotatably held via an air gap 222 inside the stator core 232. The rotor 250 includes a rotor core 252 and a permanent magnet 254. The rotor core 252 is fixed to a shaft 218. The housing 212 has a pair of end brackets 214 with bearings 216 provided therein, and the shaft 218 is rotatably held by the bearings 216. The stator core 232 is made by laminating a number of magnetic steel plates, for example, silicon steel plates, each having a thickness of 0.2 to 0.35 millimeters. The lamination of thin steel plates can suppress the occurrence of eddy current, thus reducing iron loss. The reduction of iron loss is very important to a rotary electric machine used in the high-speed rotation region, such as that of this embodiment.

Figure 4:
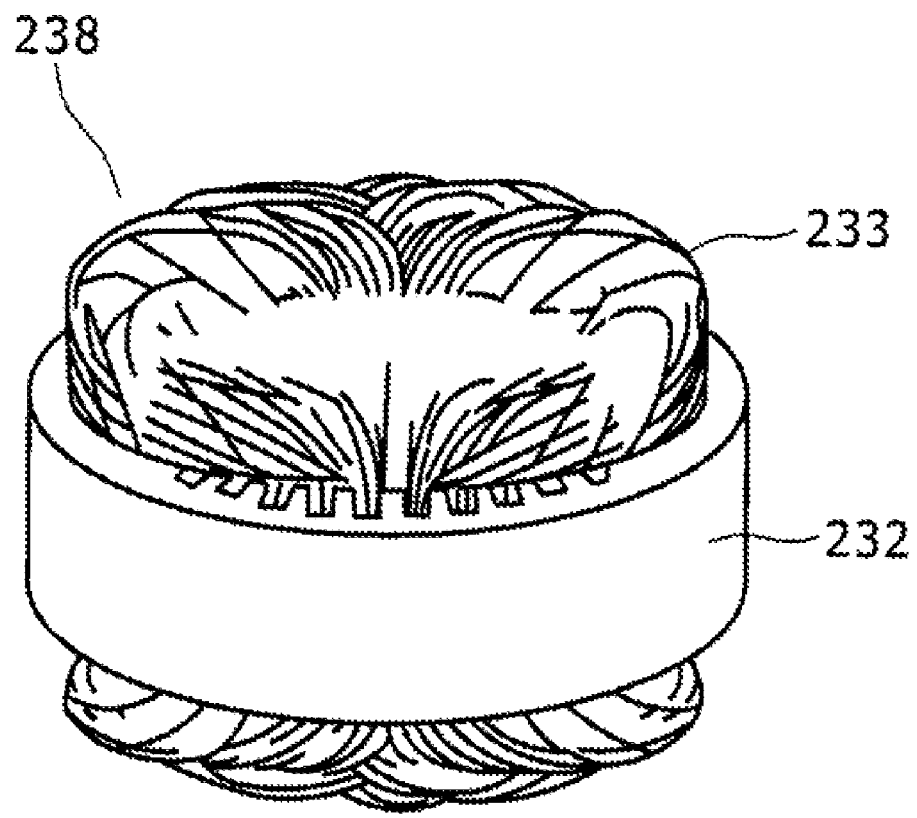
FIG. 4 is a perspective view showing an external appearance of a stator 230.

FIG. 4 is a diagram showing an external appearance of the stator 230. The stator windings 238 provided in the stator 230 are formed by distributed winding of coils 233. A magnetic field formed by the stator windings 238 distributed and wound has the magnetic flux distribution substantially in the shape of a sine wave. Thus, the rotary electric machine employing the distributed winding stator 230 easily obtains the reluctance torque, and is appropriated for obtaining a motor property for an electric vehicle or the like. In this embodiment, the stator including the distributed winding type stator windings will be mainly described as an example. Although a concentrated winding type state winding has a slightly worse electric property, it can be used.

As shown in FIG. 3, the shaft 218 is provided with a rotor position sensor 224 for detecting the position of a pole of the rotor 250, and a rotation speed sensor 226 for detecting the rotation speed of the rotor 250. Outputs from the sensors 224 and 226 are taken into the control circuit 648 shown in FIG. 2. The control circuit 648 outputs a control signal to the drive circuit 653 based on the output taken. The drive circuit 653 outputs the drive signal based on the control signal to the power module 610. The power module 610 performs the switching operation based on the control signal, and converts the direct-current power supplied from the battery 180 into the three-phase alternating-current power. The three-phase alternating-current power is supplied to the stator windings 238 shown in FIGS. 3 and 4, so that a rotating magnetic field is generated in the stator 230. The frequency of the three-phase alternating current is controlled based on the detection value of the rotation speed sensor 226. The phase corresponding to the rotor 250 of the three-phase alternating current is controlled based on the detection value of the rotor position sensor 224.

Figure 5A:
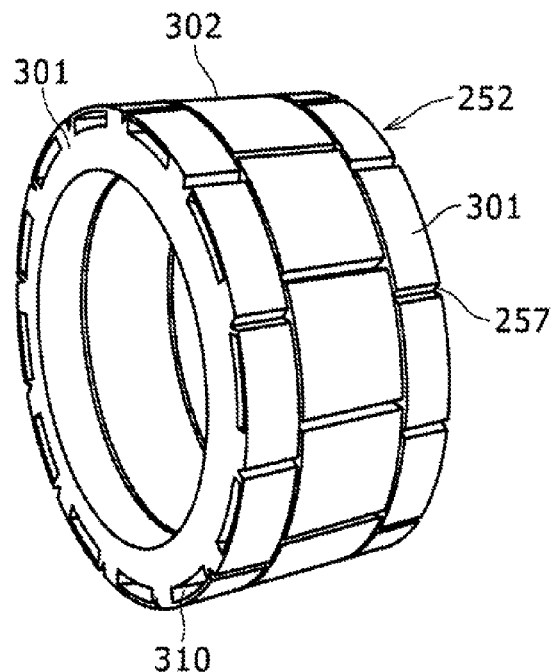
FIG. 5A is a perspective view of a rotor core 252.
Figure 5B:
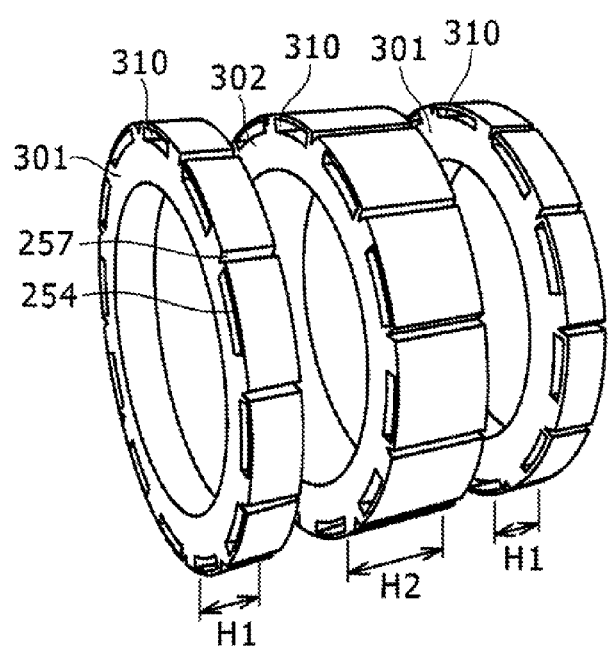
FIG. 5B is an exploded perspective view of the rotor core 252.
Figure 6A:
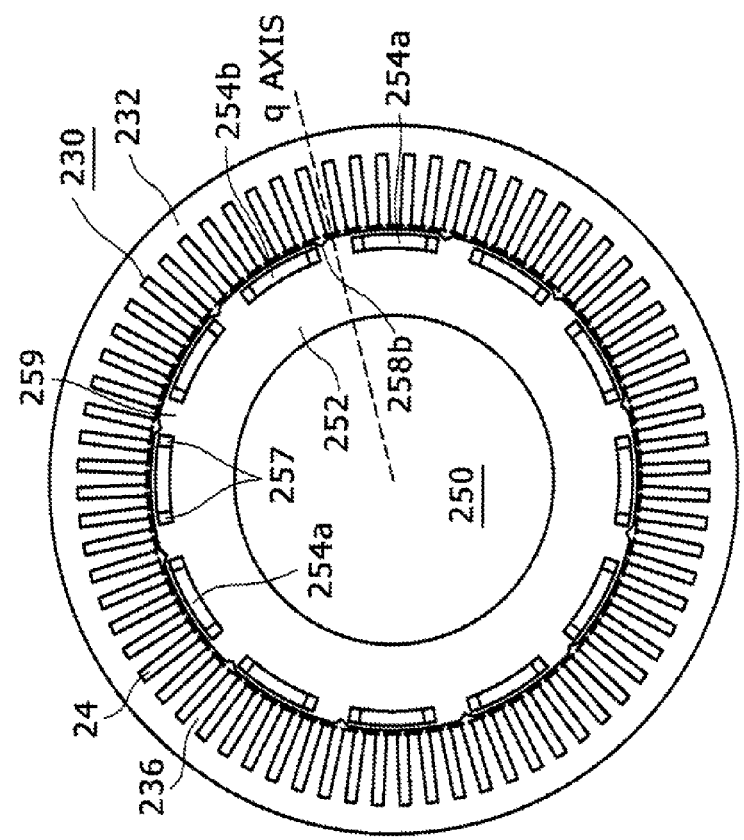
FIG. 6A is a sectional view of the stator 230 and a rotor 250 taken along the line A-A passing through a core 301.
Figure 6B:
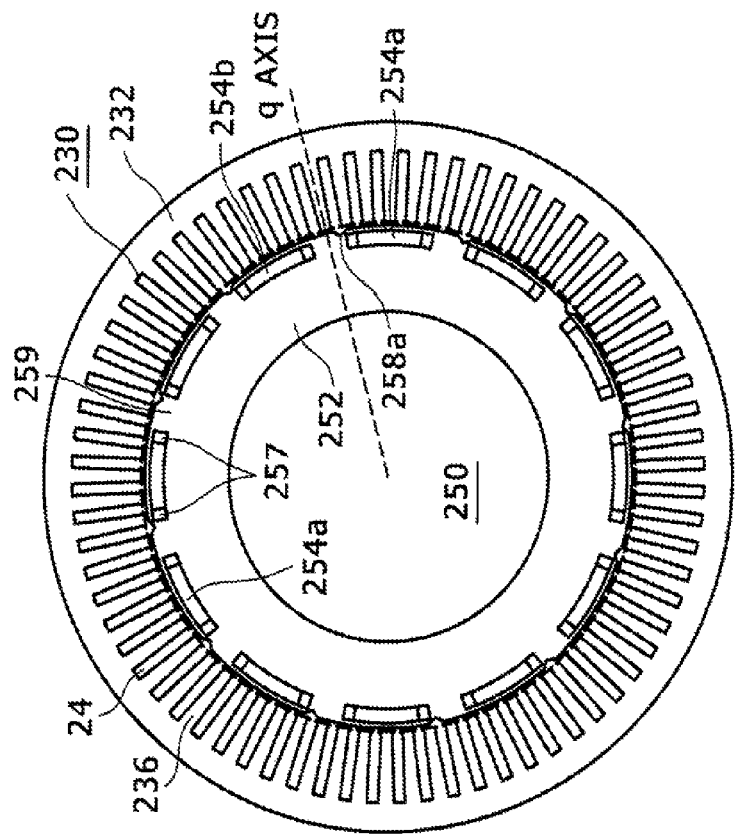
FIG. 6B is a sectional view of the stator 230 and a rotor 250 taken along the line B-B passing through a core 302.

FIG. 5A is a perspective view showing the rotor core 252 of the rotor 250. The rotor core 252 consists of three cores 301, 302, and 301 as shown in FIG. 5B. The length H2 of the core 302 in the axial direction is set about twice as long as the length H1 of the core 301 in the axial direction. FIG. 6 shows sections of the stator 230 and the rotor 250, in which FIG. 6A is a sectional view taken along the line A-A passing through the part of the core 301 (see FIG. 3), and FIG. 6B is a sectional view taken along the line B-B passing through the part of the core 302 (see FIG. 3). FIG. 6 omits the illustration of the housing 212, the shaft 218, and the stator winding 238. The rotor core 252 is made by laminating a number of magnetic steel plates, for example, silicon steel plates, each having a thickness of 0.2 to 0.35 millimeters, like the above-mentioned stator core. The lamination of thin steel plates can suppress the occurrence of eddy current, thus reducing iron loss. The reduction of iron loss is very important to the rotary electric machine used in the high-speed rotation region, like this embodiment.

A number of slots 24 and teeth 236 are evenly arranged along the entire periphery of the stator core 232 on the inner peripheral side thereof, and the coil 233 is wound as shown in FIG. 4. In this embodiment, the number of slots is 72, but may be any other one. In FIG. 6, all slots and teeth are not designated by reference numerals, and only parts of the teeth and slots are indicated as the representatives by the respective reference numerals. A slot insulator (not shown) is provided in the slot 24, and a plurality of phase windings of u to w phases constituting the stator windings 238 are mounted on the slots 24. As mentioned above, this embodiment employs the distributed winding as the way to wind the stator windings 238.

The term "distributed winding" as used herein means a winding system in which the phase windings are wound around the stator core 232 such that each phase winding is accommodated in two of the slots 24 spaced apart from each other via other slots. In this embodiment, the distributed winding is used as the winding system, and thus the control can be performed by using weak field magnet control and reluctance torque in a wide range of the number of revolutions, including not only a low rotation speed, but also a high rotation speed. As mentioned above, the reluctance torque is used to enable reduction of the magnet torque due to the magnetic flux generated by the magnet, which can decrease the amount of permanent magnet material. As a result, the amount of magnetic flux generated from the magnet is decreased, so that the induced voltage generated in the stator winding together with the rotation becomes small. When the induced voltage generated in the stator winding 238 is large, a difference between a voltage applied from the power converter 600 to the rotary electric machine 200 or 202 and the induced voltage becomes small, which makes it difficult to supply the alternating current from the power converter 600. In this embodiment, the use of the reluctance torque can reduce the induced voltage generated in the stator winding 238, so that the alternating current can be supplied from the power converter 600 to the stator winding 238 even in the high-speed rotation region, thereby enabling generation of rotary torque at the rotary electric machine.

Each of the cores 301 and 302 of the rotor core 252 has holes 310 into each of which a magnet having a magnetic section shown in FIG. 6, that is, a substantially rectangular or fan-shaped section at a surface perpendicular to the rotation axis is inserted. The holes 310 are formed at even intervals along the entire periphery of the rotor as shown in FIG. 5. The permanent magnet 254 is embedded in each hole 310, and fixed thereto by an adhesive or the like. The width of the hole 310 in the circumferential direction is set larger than that of the permanent magnet 254 in the circumferential direction, and the magnetic air gaps 257 are formed on both sides of the permanent magnet 254. The magnetic air gap 257 may have the adhesive embedded therein, or may be integrally fixed together with the permanent magnet 254 by resin, or may be a hollow air gap. The permanent magnet 254 acts as a field pole of the rotor 250. In this embodiment, one permanent magnet forms one magnetic pole, but a plurality of magnets may form one magnetic pole. The permanent magnets may be arranged in the direction of rotation, or may be superimposed on each other in the radial direction. The permanent magnets need to generate the magnetic flux having the same polarity in units of magnetic pole, and are required to be magnetized in the same direction in relation to the opposed stator. The increase in number of magnets for each magnetic pole can increase the total amount of magnetic fluxes thereby to increase the magnet torque.

The magnetization direction of the permanent magnet 254 is the radial direction. The magnetization direction is reversed every field pole. That is, the stator side surface of a permanent magnet 254a is the N pole, and the axis side surface thereof is the S pole. The stator side surface of an adjacent permanent magnet 254b is the S pole, and the axis side surface thereof is the N pole. These permanent magnets 254a and 254b are alternately arranged in the circumferential direction. In this embodiment, twelve permanent magnets 254 are arranged at even intervals, and the rotor 250 has twelve poles.

The permanent magnet 254 may embed the rotor core 252 after magnification. Alternatively, the permanent magnet 254 maybe inserted into the rotor core 252 before magnification, and then may be magnified by applying a strong magnetic field. The permanent magnetic 254 after magnetization becomes a strong magnet. When the magnet is magnetized before the permanent magnet 254 is fixed to the rotor 250, a strong attraction force is generated between the permanent magnet 254 and the rotor core 252 in fixing the permanent magnet 254, and then acts to interrupt the work. The strong attraction force may cause contaminants, such as iron powder, to adhere to the permanent magnet 254. Thus, the permanent magnet 254 is inserted into the hole 310 of the rotor core 252, and magnified after being fixed, which improves the productivity of the rotary electric machine.

The permanent magnet 254 can be made of a neodymium-based sintered magnet, a samarium-based sintered magnet, a ferrite magnet, a neodymium-based bonded magnet, or the like. In particular, the neodymium-based permanent magnetic has a strong magnetic force, and thus is suitable in use for the rotary electric machine for driving the vehicle which generates high torque. The residual reflux density of the permanent magnet 254 is desirably about 0.4 to 1.3 T.

Figure 7A:
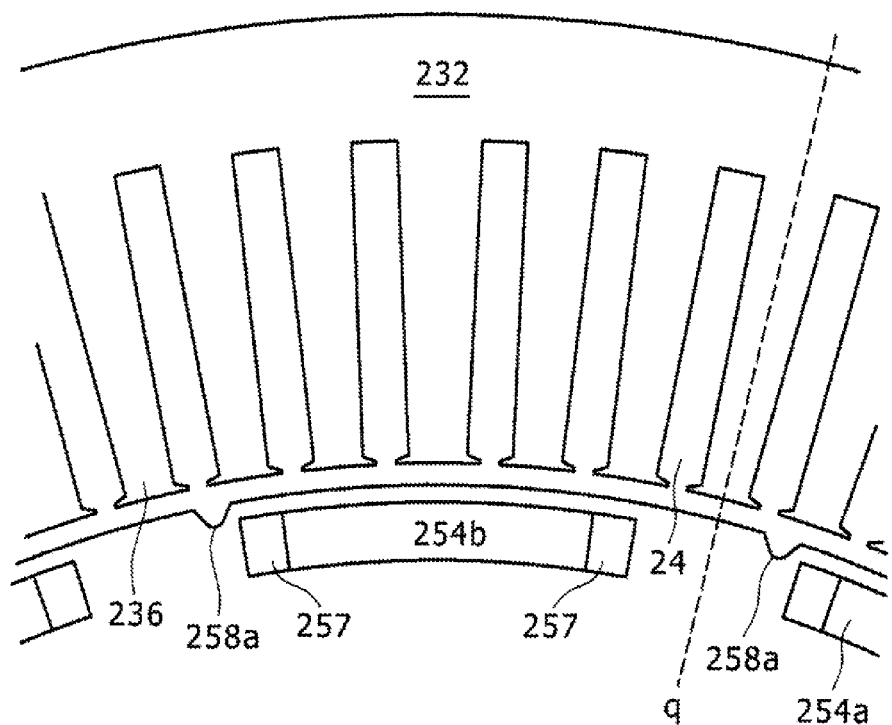
FIG. 7A is an enlarged sectional view of the vicinity of a permanent magnet 254b taken along the line A-A.

FIG. 7A is an enlarged view of the vicinity of the permanent magnet 254b whose section is shown in FIG. 6A. The core 301 of the rotor core 252 is provided with slots for forming magnetic air gaps 258a on the surface of the rotor 250, in addition to the magnetic air gaps 257 formed on both sides of the permanent magnet 254. The magnetic air gap 257 is provided for reducing the cogging torque, and the magnetic air gap 258a is provided for reducing the torque pulsation in energization. The magnetic air gap 258a is arranged shifted rightward with respect to the q axis serving as the center axis between the magnets.

Figure 7B:
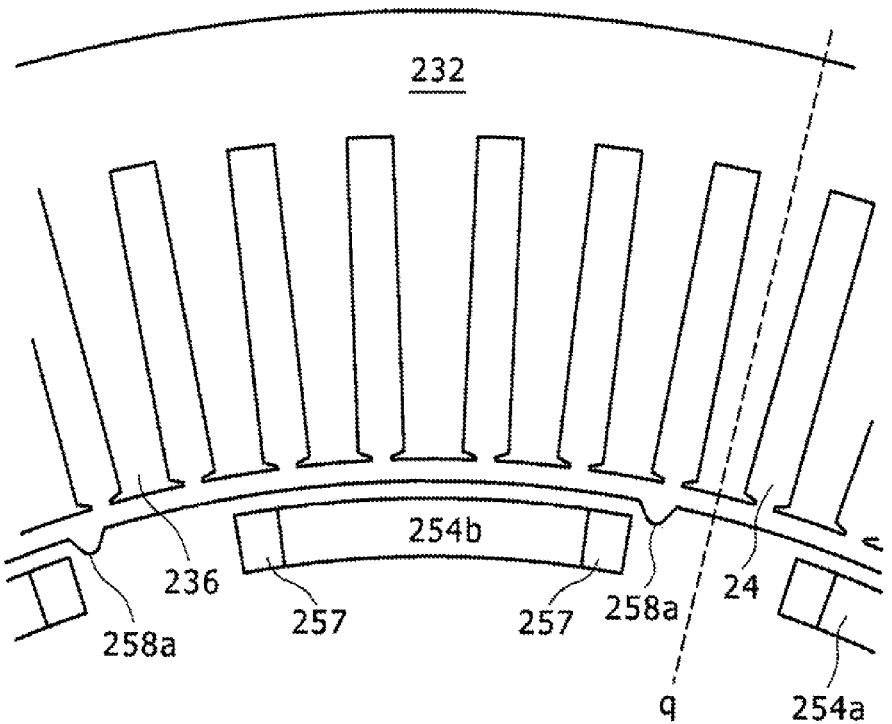
FIG. 7B is an enlarged sectional view of the vicinity of the permanent magnet 254b taken along the line B-B.

FIG. 7B is an enlarged view showing the vicinity of the permanent magnet 254b whose section is shown in FIG. 6B. A core 302 shown in FIG. 7B has magnetic air gaps 258b formed, instead of the magnetic air gaps 258a. The magnetic air gap 258b is arranged shifted leftward with respect to the q axis. As shown in FIGS. 6 and 7, the core 301 and the core 302 have the same sectional shape except for the positions of the magnetic air gaps 258a and 258b.

The magnetic air gaps 258a and 258b have the symmetric positions and shapes to each other with respect to the q axis. That is, the thin silicon steel plate (electromagnetic steel plate) constituting the core 301 is turned upside down to be laminated on another steel plate, thereby to form the core 302. This can reduce a manufacturing cost because a mold costs less. The positions of the holes 310 of each of the cores 301 and 302 in the circumferential direction are aligned with each other without misalignment. As a result, each permanent magnet 254 fitted in each hole 310 integrally penetrates each of the cores 301 and 302 without being separated in the axial direction. It is apparent that permanent magnets 254 divided into may be provided so as to be laminated in the axial direction of the holes 310.

When the rotating magnetic field is generated in the stator 230 by the three-phase alternating current, the rotating magnetic field acts on the permanent magnets 254a and 254b of the rotor 250 to generate the magnet torque. The reluctance torque in addition to the magnet torque also acts on the rotor 250.

Figure 8:
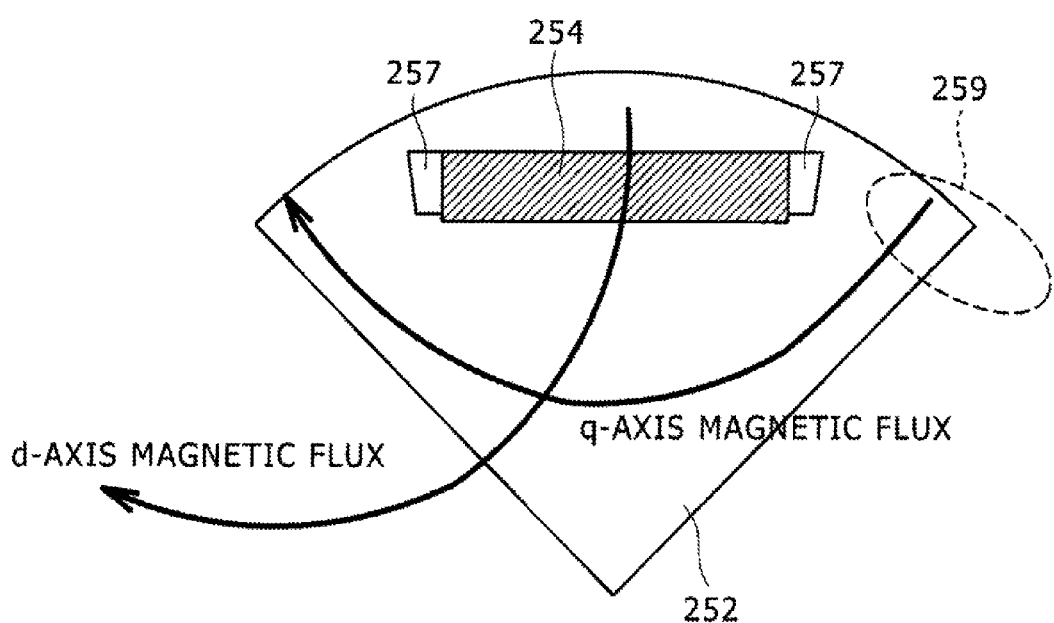
FIG. 8 is a diagram explaining a reluctance torque.

FIG. 8 is a diagram for explaining the reluctance torque. Generally, the axis on which the magnetic flux passes through the center of the magnet is referred to as a "d axis", and the axis on which the magnetic flux flows from between poles of one magnet to between poles of another magnet is referred to as a "q axis". At this time, a core portion between field poles is referred to as an "auxiliary salient pole 259". Since the magnetic permeability of the permanent magnet 254 provided in the rotor 250 is substantially the same as that of air, a d-axis portion is magnetically concave, and a q-axis portion is magnetically convex as viewed from the stator side. Thus, a core of the q-axis portion is referred to as a salient pole. The reluctance torque is generated by a difference of permeability of magnetic flux between the d axis and the q axis, that is, a salient pole ratio.

As mentioned above, the rotary electric machine of this embodiment is a rotary electric machine using both magnet torque and reluctance torque of the auxiliary salient pole. Torque pulsations from the magnet torque and the reluctance torque are respectively generated. The torque pulsation includes a pulsation component generated in non-energization and a pulsation component generated in energization. The pulsation component generated in non-energization is generally called as cogging torque. Most of the conventionally methods for reducing the torque pulsation as described in the related art takes into consideration only the cogging torque. However, in use of the rotary electric machine under load, the torque pulsation of a mixture of the cogging torque and the pulsation component in energization is actually generated.

Most of the methods for reducing such torque pulsation of the rotary electric machine take into consideration only the reduction of the cogging torque, and hardly consider the torque pulsation generated in energization. Noise of the rotary electric machine occurs under no load, but under load in many cases. That is, in order to reduce noise of the rotary electric machine, it is important to reduce the torque pulsation under load. Only measures against the cogging torque are not sufficient.

Now, a method for reducing torque pulsation in this embodiment will be described below.

(Magnet Torque)

Figure 9:
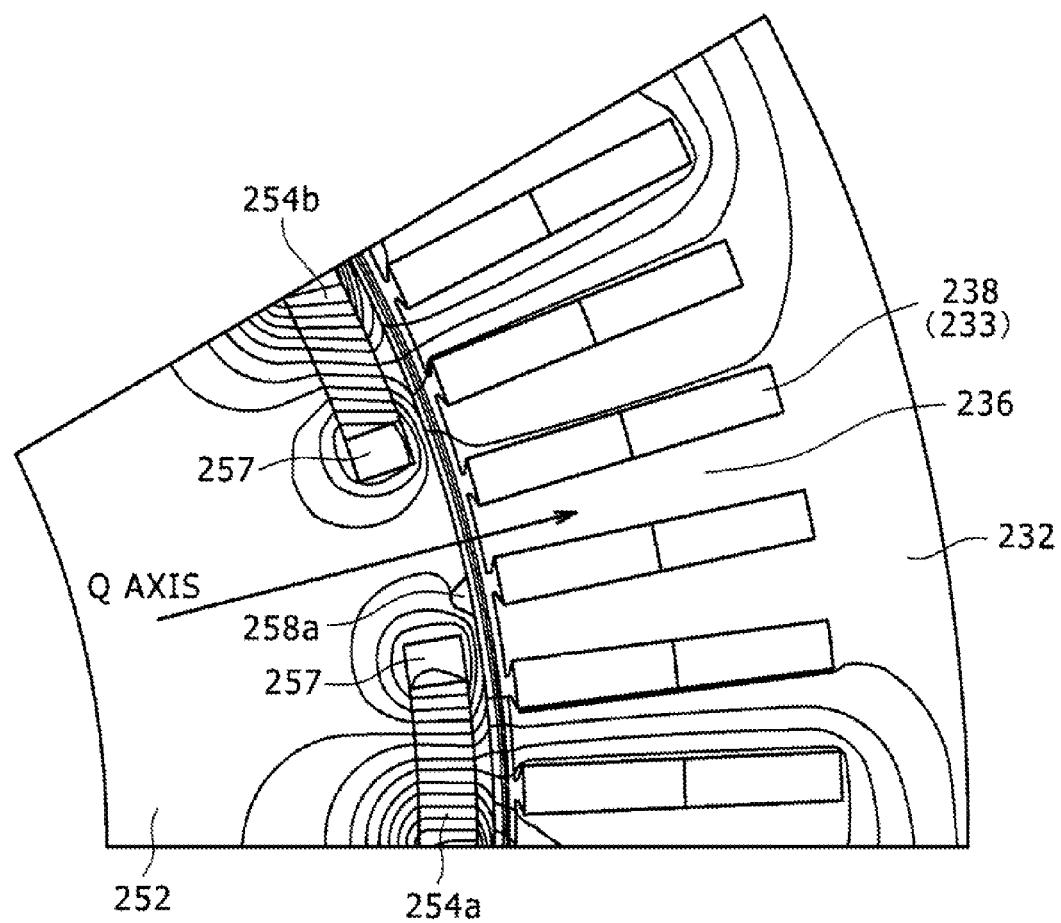
FIG. 9 is a diagram showing the distribution of magnetic flux in non-energization.

First, the magnet torque will be described. FIG. 9 is a sectional view of a simulation result of distribution of magnetic flux, taken along the line A-A, when no current passes through the stator winding 338, that is, of magnetic flux provided by the permanent magnet 254. In non-energization, the magnetic flux of the permanent magnetic 254 short-circuits the end of the magnet. Thus, the magnetic flux generated by the permanent magnet 254 hardly passes through the auxiliary salient pole 259 for allowing the magnetic flux on the q axis to pass therethrough. It is found that the magnetic flux also hardly passes through the magnetic air gap 258a provided slightly shifted from the magnetic air gap 257 of the end of the magnet. The magnetic flux passing through the stator 232 leads to the teeth 236 through the core on the stator side of the permanent magnet 254.

The same distribution of magnetic flux as that on the sectional view taken along the line A-A is also obtained on a sectional view taken along the line B-B. The magnetic flux never passes through the auxiliary salient pole 259 for allowing the magnetic flux on the q axis to pass therethrough, and hardly passes through the part of the magnetic air gap 258b. Thus, the magnetic air gaps 258a and 258b have little influence on the magnetic flux associated with the cogging torque in non-energization. As a result, the magnetic air gaps 258a and 258b have little influence on the cogging torque.

Figure 10B:
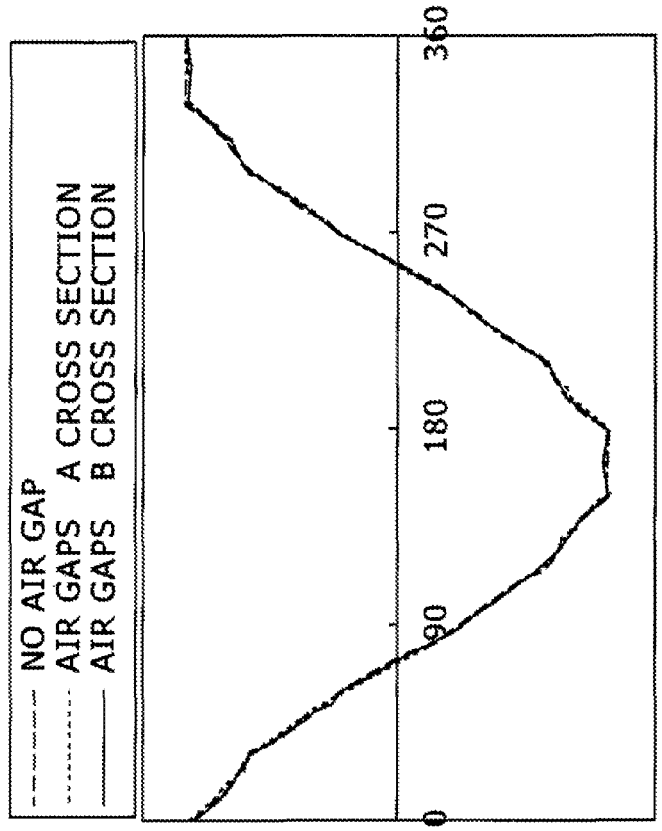
FIG. 10B is a property diagram of a waveform of an induced voltage in non-energization.
Figure 10A:
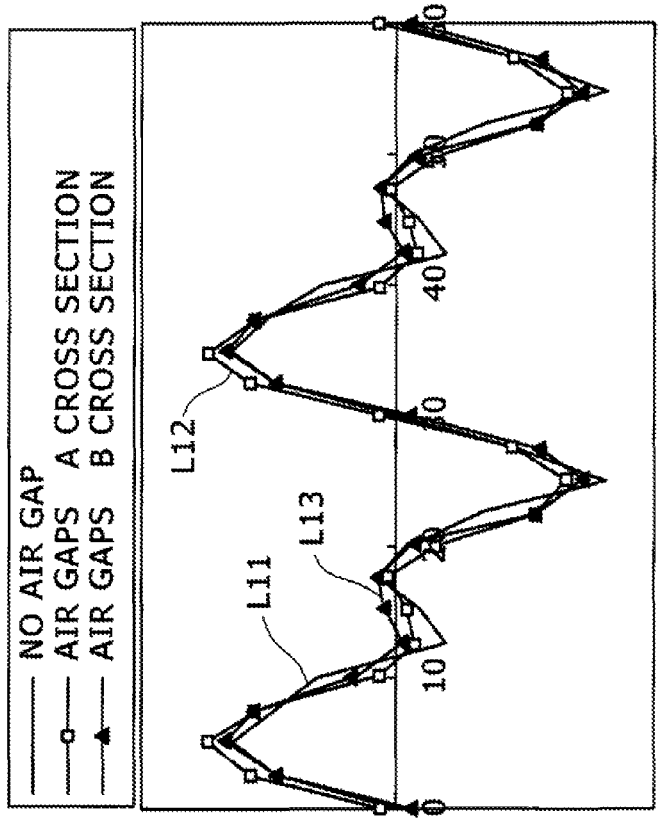
FIG. 10A is a property diagram of a waveform of a cogging torque in non-energization.

FIG. 10A shows a waveform of cogging torque actually measured, and FIG. 10B shows a waveform of induced voltage generated on the stator side when the rotor 250 rotates. The lateral axis indicates a rotation angle of the rotor in terms of electrical angle.

The line L11 indicates the rotor without the magnetic air gap 258, the line L12 indicates the rotor provided with the magnetic air gap 258a, and the line L13 indicates the rotor provided with the magnetic air gap 258b. As can be seen from the result shown in FIG. 10B, the presence or absence of the magnetic air gaps 258a and 258b hardly have influence on the cogging torque.

The induced voltage is a voltage generated by causing the magnetic flux of the magnet of the rotating rotor 250 to intersect the stator windings 238. However, as shown in FIG. 10B, the waveform of the induced voltage has a sine wave shape without being influenced by the presence or absence of the magnetic air gaps 258a and 258b. The induced voltage reflects the magnetic flux of the magnet shown in FIG. 9. The fact that the induced voltage hardly changes means that the magnetic air gaps 258a and 258b hardly have any influence on the magnetic flux of the magnet.

(Reluctance Torque)

Figure 11:
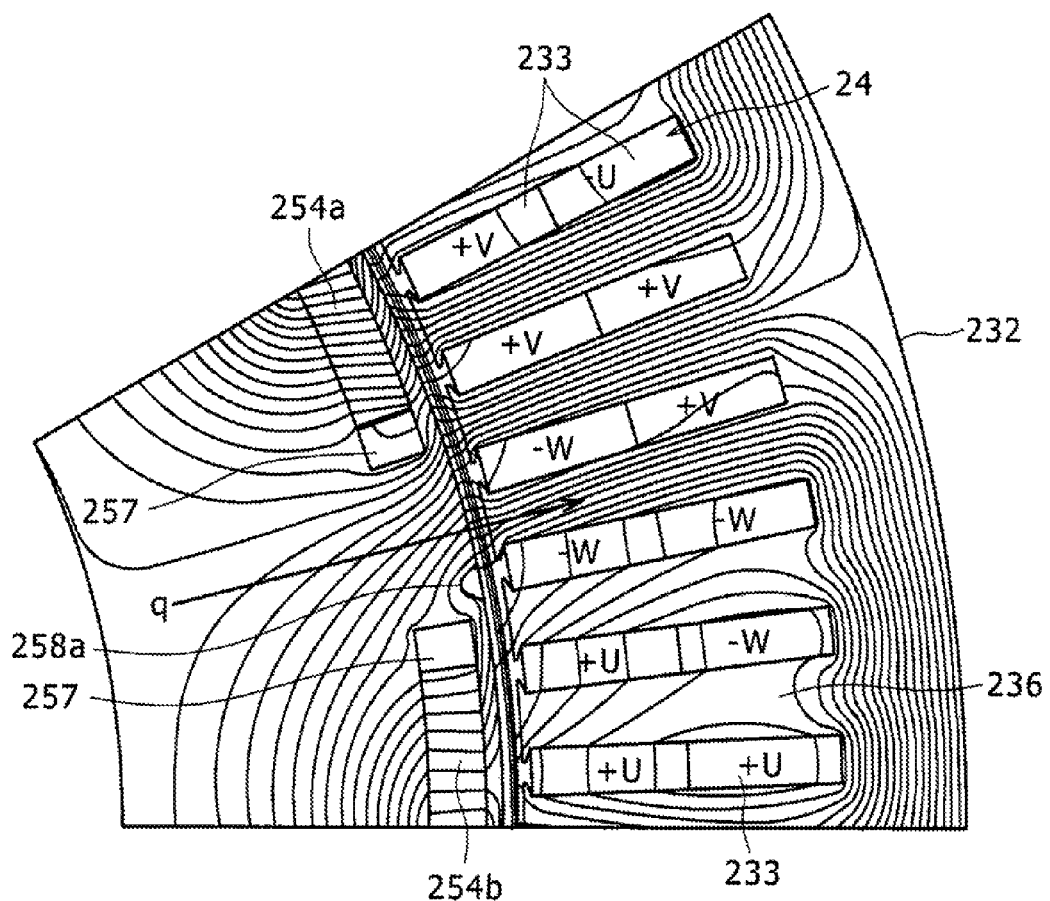
FIG. 11 is a diagram showing the distribution of magnetic flux taken along the line A-A in energization.
Figure 12:
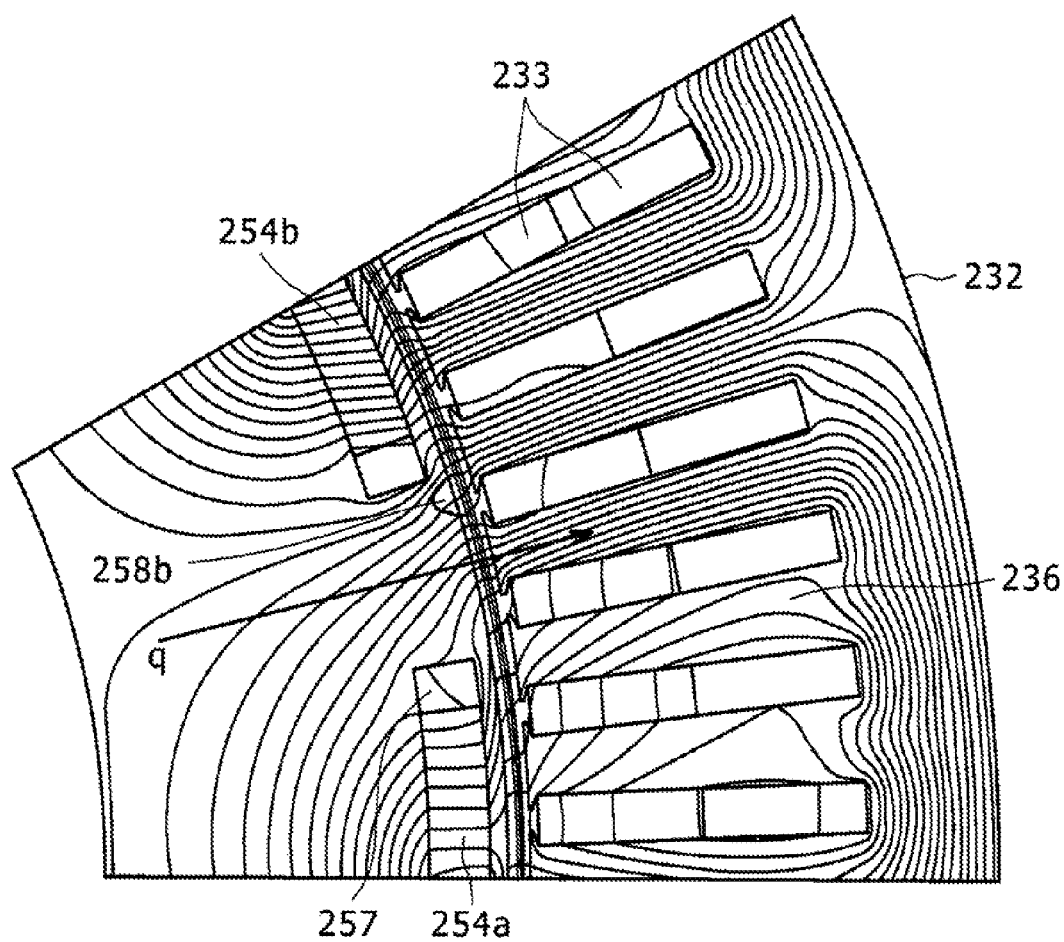
FIG. 12 is a diagram showing the distribution of magnetic flux taken along the line B-B in energization.

Now, influences of the magnetic air gaps 258a and 258b on the reluctance torque will be described below. FIGS. 11 and 12 show magnetic fluxes in energization. FIG. 11 is a sectional view taken along the line A-A, and FIG. 12 is a sectional view taken along the line B-B. The rotary electric machine of this embodiment is a motor having 6 slots per one pole. The coils 233 of the stator windings 238 provided in the slots 24 of the stator core 232 are divided into two layers in the direction of depth of the slot. When a slot adjacent to the coil 233 disposed on the bottom side of the corresponding slot is countered as the first slot, each coil 233 is inserted into another slot on the rotor side of the sixth slot 24 across first to fifth slots, which is fractional pitch winding. The fractional pitch winding can reduce higher harmonic of a magnetomotive force of the stator, and has a short coil end and a little copper loss. Such winding for reduction of the higher harmonic can lessen the sixth torque pulsation specific to the three-phase motor, so that only the twelfth pulsation component remains.

As can be seen from FIGS. 11 and 12, many magnetic fluxes pass through the q axis, and the magnetic air gaps 258a and 258b allow many magnetic fluxes to flow therethrough. This is because the current of the stator 230 makes magnetic fluxes on the q axis. Thus, the magnetic air gaps 258a and 258b located at the auxiliary salient poles exert a magnetic influence in energization.

Figure 13:
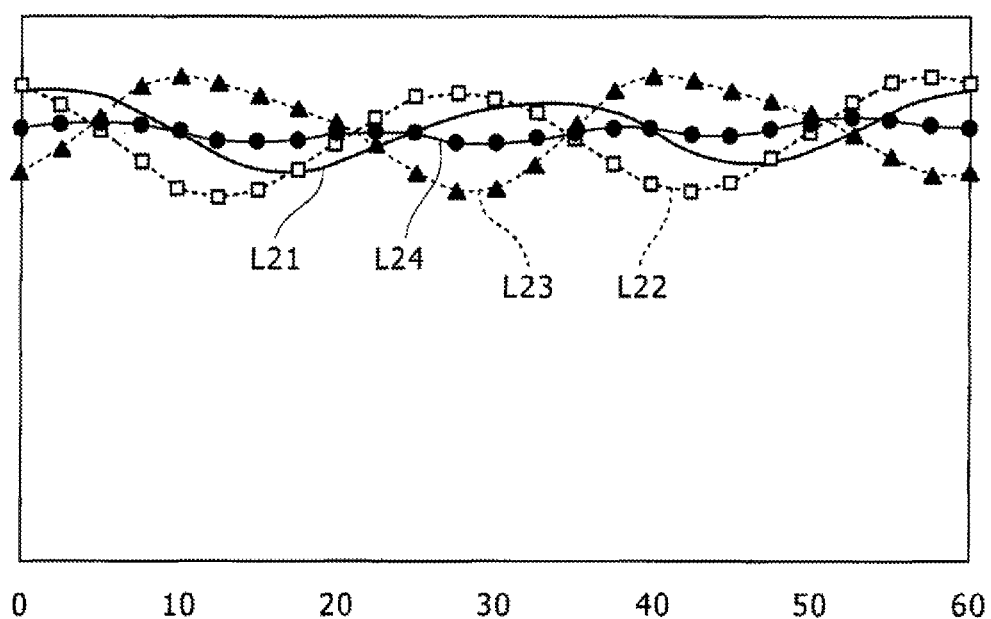
FIG. 13 is a diagram showing a waveform of the torque pulsation in energization.

FIG. 13 shows the level of torque pulsation calculated per unit axial length. The line L21 indicates the case where the magnetic air gap 258 is not formed, the line L22 indicates the case where the magnetic air gap 258a is formed, and the line L23 indicates the case where the magnetic air gap 258b is formed. The line L24 indicates the torque pulsation in this embodiment employing the rotor 250 with the rotor core 252 shown in FIG. 5. As mentioned above, in the rotary electric machine of this embodiment, a twelfth component of torque pulsation, that is, a component having 30 degrees as one cycle in terms of electrical angle is predominant. As can be seen from FIG. 13, the twelfth component is predominant, and the sixth component hardly exists.

The case of forming the magnetic air gap 258a, and the case of forming the magnetic air gap 258b are found to cause the waveform of the torque pulsation to change with respect to the torque pulsation obtained when not forming the magnetic air gap 258. This means that the magnetic flux in energization is influenced by the magnetic air gaps 258a and 258b. The waveform in forming the magnetic air gap 258a has a phase substantially opposite to that of a waveform in forming the magnetic air gap 258b. As shown in FIG. 5, the ratio of the axial length of the core 301 to that of the core 302, which constitute the rotor 250, is set to about 1:2, so that the total torque pulsation L24 received by the entire rotor is an average of the torque pulsations indicated by the lines L22 and L23. The total torque pulsation L24 is found to be small with respect to the case in which the magnetic air gap 258 is not provided.

In this way, in this embodiment, the provision of the above magnetic air gaps 258a and 258b can reduce the torque pulsation in energization. In order to obtain such an effect, the width angle (the angle in the circumferential direction) of the slot forming the magnetic air gap 258 is preferably set equal to or less than half an angle of the auxiliary salient pole in the circumferential direction.

The formation of the magnetic air gaps has the advantage of not decreasing the torque as compared to the case in which no magnetic air gap is provided. Conventionally, a structure with skew for reducing torque pulsation results in a decrease in torque by the skew. This makes it difficult to downsize the conventional rotary electric machine structure. However, this embodiment can reduce only the torque pulsation of the reluctance torque, separately from the cogging torque, which has the advantage that the torque itself is not reduced. This is because the toque pulsation in the rotor without slots has the predominant twelfth component, and because the fractional pitch winding of the stator windings is implemented.

(Reduction of Cogging Torque)

As mentioned above, the formation of the magnetic air gaps 258a and 258b does not have any influence on the cogging torque in non-energization. Thus, the conventional method for reducing the cogging torque can be applied to reduce the cogging torque, separately from the reduction of the torque pulsation in energization. In this embodiment, the following arrangement can also reduce cogging torque.

Figure 14:
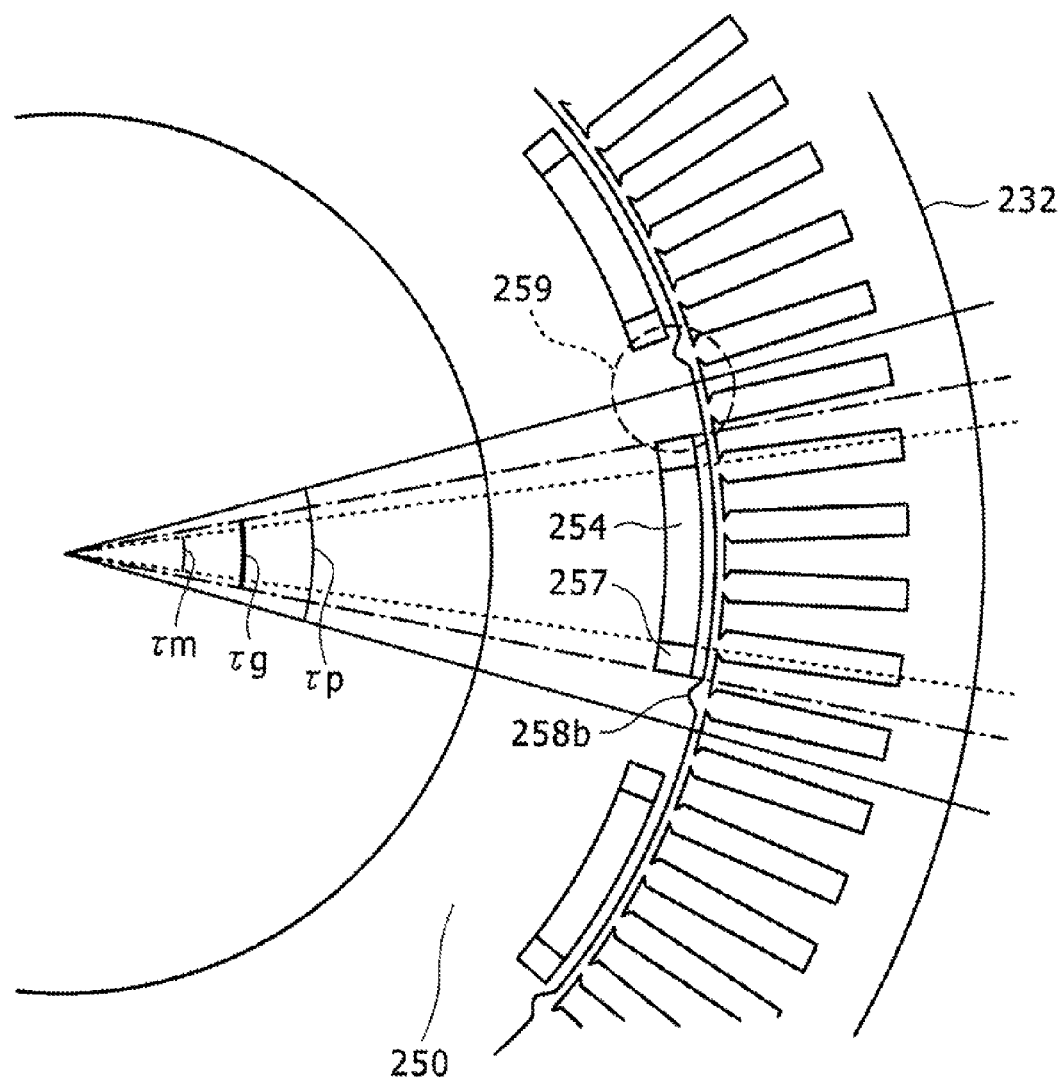
FIG. 14 is a sectional view showing parts of the stator 232 and the rotor 250 for explaining the reduction of cogging torque.
Figure 15:
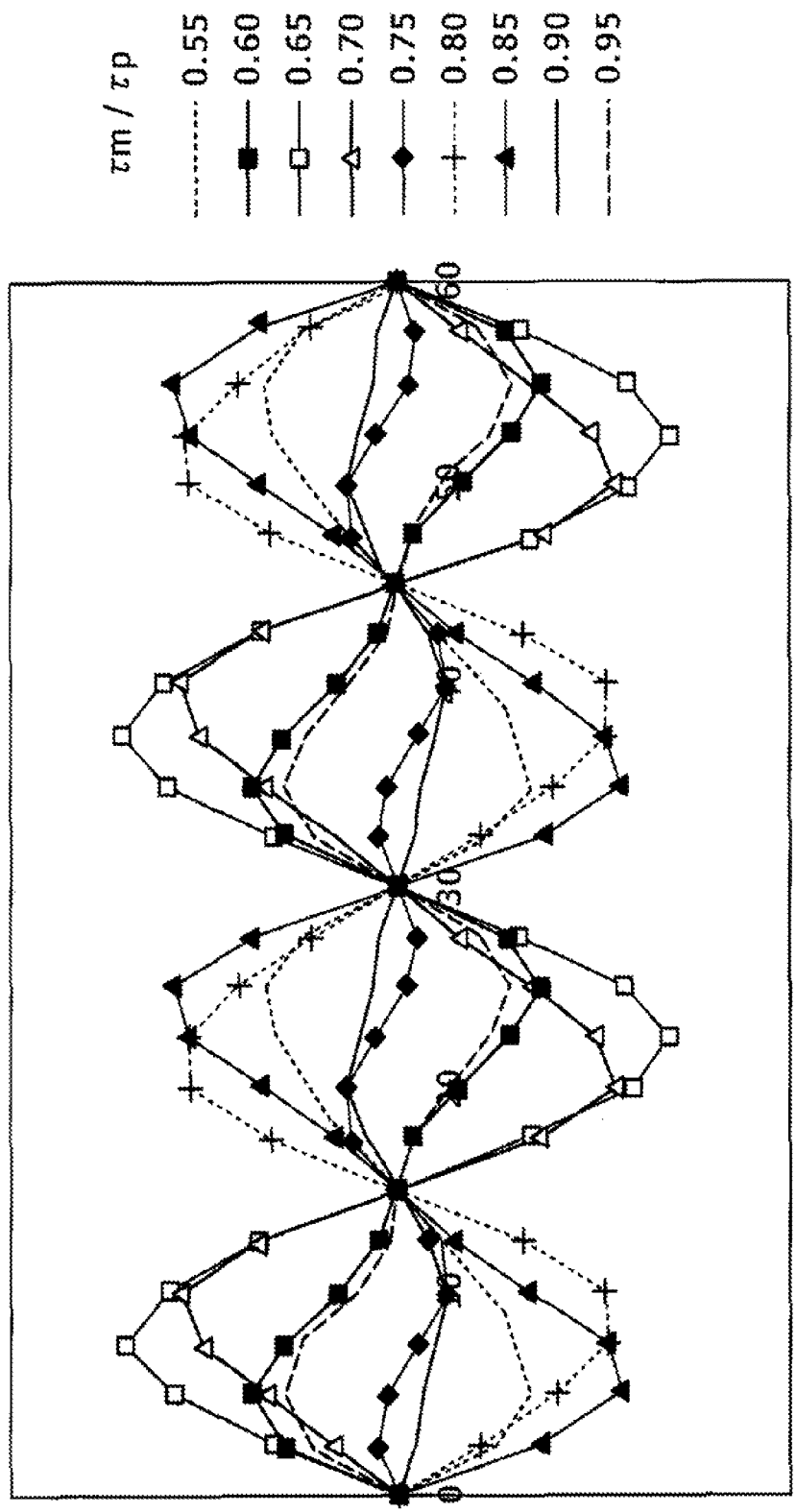
FIG. 15 is a diagram showing a relationship between a cogging torque and a rate of a magnetic pole arc degree τg/τp.

FIGS. 14 and 15 are diagrams for explaining the method for reducing the cogging torque. FIG. 14 is a sectional view of parts of the rotor 250 and the stator core 232. In FIG. 14, τp is a polar pitch of the permanent magnet 254, and τm is a width angle of the permanent magnet 254. Further, τg is an angle formed by combination of the permanent magnet 254 and the magnet air gaps 257 provided on both sides thereof, that is, a width angle of the hole 310 as shown in FIG. 5. Thus, the cogging torque can be reduced by adjusting the angle ratio of τm/τp, and the angle ratio of τg/τp. In this embodiment, the ratio of τm/τp is hereinafter referred to as a magnet pole arc degree, and the ratio of τg/τp as a magnet hole pole arc degree.

FIG. 15 is a diagram showing the relationship between the ratio of magnet pole arc degree τm/τp and the cogging torque. The result shown in FIG. 15 is obtained in the case of τm=τg.

In FIG. 15, the longitudinal axis indicates an amplitude of cogging torque, and the lateral axis indicates a rotation angle of the rotor 250 in terms of electrical angle. The level of the amplitude of pulsation changes depending on the ratio of $\tau m/\tau p$. For $\tau m=\tau g$, when the $\tau m/\tau p$ is selected to be about 0.75, the cogging torque can be reduced. The tendency that the magnetic air gap 258 shown in FIG. 10 does not change the cogging torque can also be applied to any case where the ratio of the magnet width to the pole pitch, that is, $\tau m/\tau p$ takes any value as shown in FIG. 15, in the same way. Thus, under the above-mentioned conditions, the shape of the rotor 250 is set to that shown in FIG. 5 or 6, which can reduce both the cogging torque and torque pulsation in energization.

In an example shown in FIG. 14, the following is set: $\tau m/\tau p=0.55$, and $\tau g/\tau p=0.7$. In this case, these values are optimal for simultaneously reducing the cogging torque in non-energization and the torque pulsation in energization. In this example, the magnet has a fan-like shape. When the magnet has a rectangular shape, such values are slightly changed, which is apparently within the same scope of the invention.

(Effective Use of Reluctance Torque)

In the example shown in FIG. 15, the relation of $\tau m=\tau p$ is satisfied as described above. In order to effectively use the reluctance torque, which is an effect of the auxiliary salient pole 259, the magnet hole pole arc degree $\tau g/\tau p$ may be preferably set to about 0.5 to 0.9, and more preferably to about 0.7 to 0.8.

Figure 16:
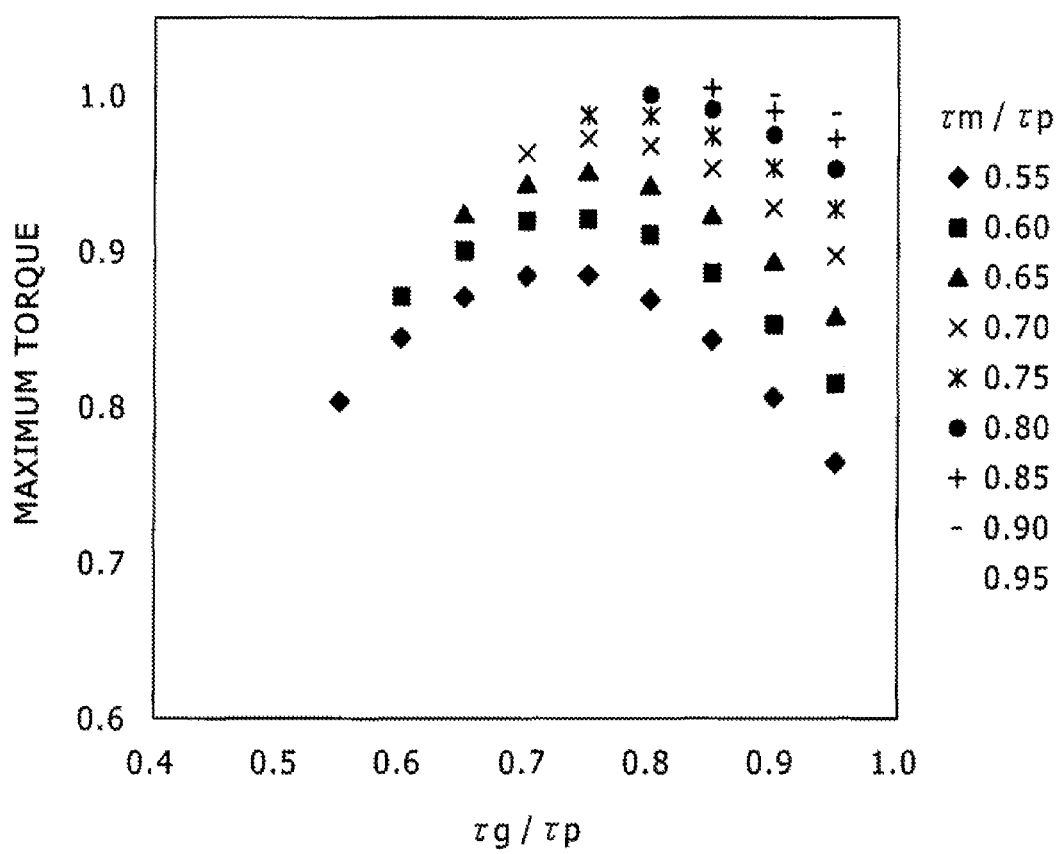
FIG. 16 shows a maximum torque when the magnet pole arc degree τm/τp and a magnet hole pole arc degree τg/τp are changed.

FIG. 16 shows a calculation example of the maximum torque obtained by changing the magnet pole arc degree $\tau m/\tau p$ and the magnet hole pole arc degree $\tau g/\tau p$. The lateral axis indicates the magnet hole pole arc degree $\tau g/\tau p$. FIG. 16 shows that the magnet hole pole arc degree $\tau g/\tau p$ of 0.7 corresponds to the ratio of the auxiliary salient pole 259 to a pitch between poles of 0.3. The magnet width $\tau m$ cannot be larger than an opening angle $\tau g$ of the magnet hole, leading to $\tau g \geqq \tau m$. As the $\tau m$ is increased, the width of the permanent magnet 254 is increased, thereby increasing the torque. On the other hand, when the $\tau m$ is constant, the $\tau g$ is an optimal value. When the ratio of $\tau g/\tau p$ is about 0.7 to 0.8, the maximum torque becomes largest. This is because the size of the auxiliary salient pole 259 can take an appropriate value, and because the reluctance torque becomes small when the value of $\tau g$ is much larger or smaller than the appropriate value. When the value of $\tau m$ is larger than 0.75, $\rho m=\tau g$ is desirable so as to make the auxiliary salient pole 259 as large as possible.

In this way, when $\tau g/\tau p$ is about 0.7 to 0.8, the reluctance torque can be used most efficiently, which can make the permanent magnet 254 small. In use of a rare-earth sintered magnet as the permanent magnet 254, the magnet is required to be used most efficiently in terms of amount because the sintered magnet is very expensive as compared to other materials. Since the permanent magnet 254 is small, the induced voltage due to the magnetic flux of the permanent magnet 254 can be lessened, so that the rotary electric machine can be rotated at higher speed. Thus, the electric vehicle uses the rotary electric machine using the reluctance torque like this embodiment as a rotary electric machine for driving the electric vehicle, thereby to obtain preferable properties.

[Explanation about Shift of Magnetic Air Gaps 258]

In the above description about the embodiments, the magnetic air gaps 258 are arranged in two different positions. That is, provision of the magnetic air gaps 258a and 258b in different positions reduces the torque pulsation in energization. Now, the way to shift the magnetic air gap 258 for reducing the torque pulsation will be described below.

Figure 17A:
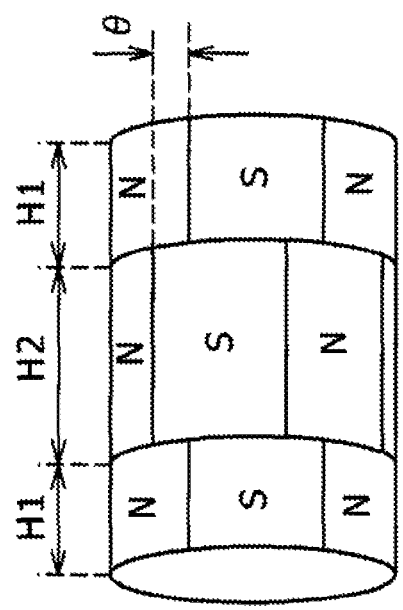
FIG. 17A is a perspective view of the skewed rotor 250, which is divided into two parts in the axial direction.
Figure 17B:
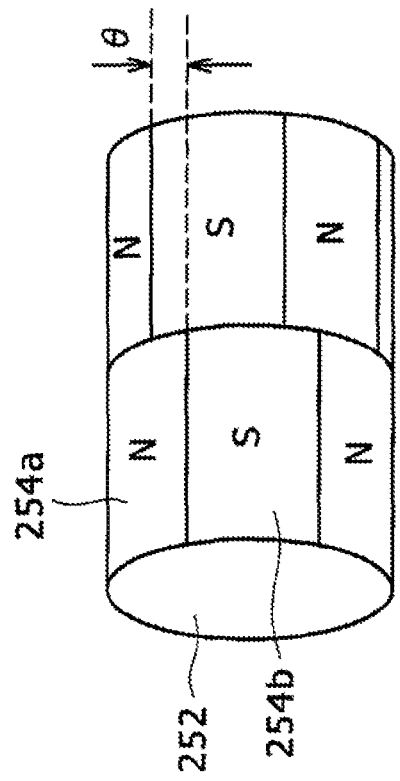
FIG. 17B is a perspective view of the skewed rotor 250, which is divided into three parts in the axial direction.

A structure with a magnet skewed is conventionally known as means for reducing the torque pulsation. The inventors have found through studies that this concept of skew can be applied to the shift of the magnetic air gaps 258. First, the skew of the magnet will be described below. FIGS. 17A and 17B are perspective views for explaining the concept of the rotor 250 with skew, in which FIG. 17A shows the case in which the rotor 250 is divided into two parts in the axial direction, and FIG. 17B shows the case in which the rotor 250 is divided into three parts in the axial direction. FIG. 17 is a schematic diagram showing an example in which the permanent magnet 254 is provided on the surface of the rotor. The same can go for a rotor in which a permanent magnet is embedded. In FIG. 17, the reference numeral $\theta$ indicates an angle of skew. In the example shown in FIG. 17B, the center core is skewed by the angle $\theta$ with respect to the cores on both ends.

Figure 18A:
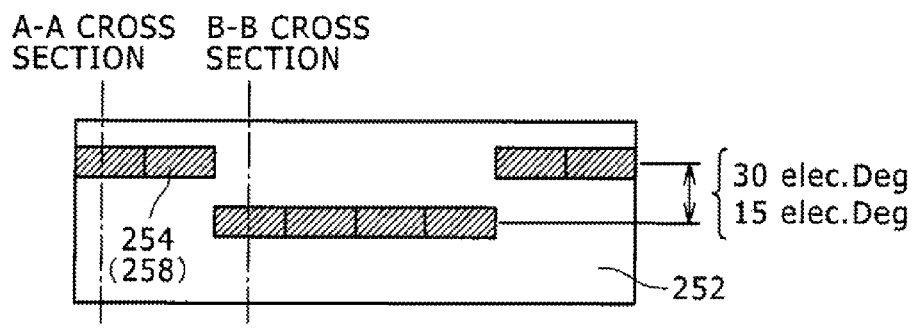
FIG. 18A shows one of four kinds of methods for laminating and skewing divided cores of the rotor.
Figure 18B:
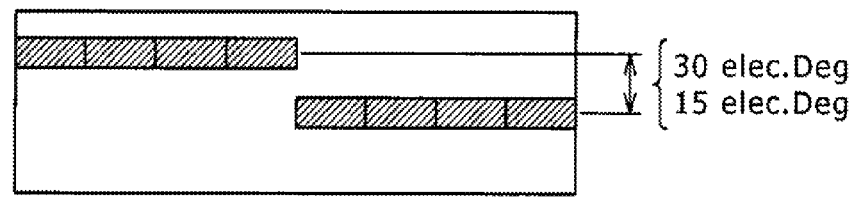
FIG. 18B shows one of four kinds of methods for laminating and skewing divided cores of the rotor.
Figure 18C:
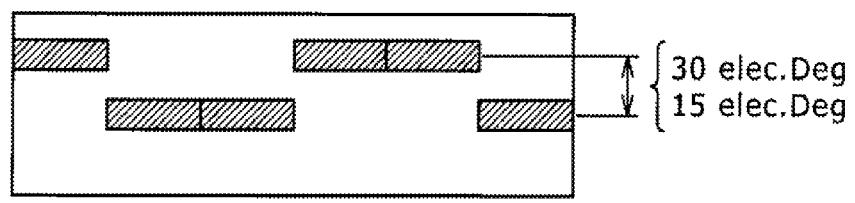
FIG. 18C shows one of four kinds of methods for laminating and skewing divided cores of the rotor.

Among various methods for skewing, four kinds of methods for skewing by laminating the cores as shown in FIG. 17 will be described below with reference to FIG. 18. In any one of cases shown in FIGS. 18A to 18D, a rotor core 252 is divided into eight cores having the same thickness in the axial direction. As shown in FIGS. 18A to 18C, when the skewing operation is performed in two stages, the skew angle $\theta$ is normally set to be 15 degrees or 30 degrees in terms of electrical angle. When setting a mechanical skew angle $\theta$, a phase shift needs to be performed based on the electrical angle corresponding to the skew angle $\theta$. In the following, the skew in terms of electrical angle will be described below.

The reason for setting the skew angle $\theta$ to 15 degrees or 30 degrees in terms of the electrical angle is that the three-phase motor normally includes sixth and twelfth torque pulsations for an electric frequency, and that the reduction of the torque pulsation needs skewing by such an angle. For example, when the sixth torque pulsation is a primary component of torque pulsation having a cycle of 60 degrees in terms of the electrical angle, a half cycle of the torque pulsation corresponds to 30 degrees in terms of electrical angle. Thus, when the skew angle $\theta$ of the core corresponds to the electrical angle of 30 degrees in skewing the divided cores, the primary components of the torque pulsations in the cycle of 60 degrees, which pulsations are generated in two respective cores shifted from each other, have reverse phases to each other, and act to cancel the respective pulsations to each other. As a result, the total torque pulsation is reduced.

Thus, the cores into which the rotor 250 is divided are shifted by 30 degrees in terms of the electrical angle as mentioned above, which can reduce the primary component of the torque pulsation. Likewise, in the case of the third component, since one cycle corresponds to 20 degrees in terms of electrical angle, 30 degrees in terms of electrical angle corresponds to one and half cycle. Further, likewise, in the case of the fifth component, 30 degrees in terms of electrical angle corresponds to two and half cycles. Thus, like the first component, the torque pulsations are substantially cancelled each other, so that the total torque pulsation is reduced. Also, the same goes for a seventh or more odd-numbered component, and the cores are skewed by 30 degrees in terms of electrical angle, which can reduce the odd-numbered component of the torque pulsation.

However, when the cores are shifted by 30 degrees in terms of electrical angle, even-numbered components, such as secondary, fourth, and the like, of the torque pulsation generated from the cores have the identical cycle to each other to increase the amplitude of the total torque pulsation. Thus, when the secondary component of the torque pulsation is smaller than the primary component thereof, shifting of the cores by 30 degrees in terms of electrical angle has an effect of reducing the torque pulsation. Conversely, when the primary component of the torque pulsation is smaller, and the secondary component thereof is larger than the primary component, shifting of the cores by 15 degrees in terms of electrical angle is very effective for reduction of the torque pulsation. For example, in the case of the secondary component, 60 degrees in terms of electrical angle corresponds to two cycles. Thus, the shifting of the cores by 15 degrees in terms of electrical angle corresponds to a phase shift of 0.5 cycle, so that the torque pulsations cancel each other.

Figure 18D:
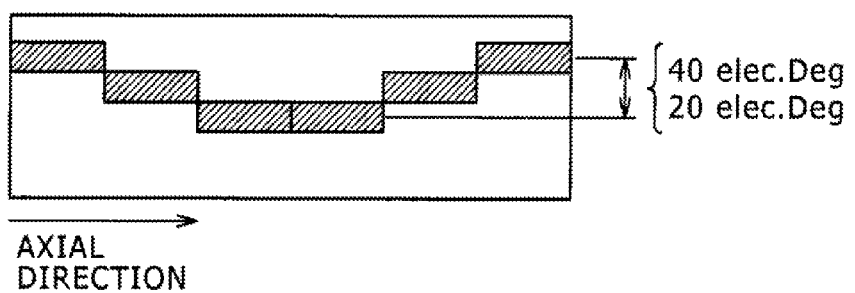
FIG. 18D shows one of four kinds of methods for laminating and skewing divided cores of the rotor.

In the examples shown in FIGS. 18A to 18C, the skew is performed in two stages, and in the example shown in FIG. 18D, the skew is performed in three stages. The permanent magnet 254 may not be divided in the axial direction in a block not skewed, or may be divided into a plurality of parts. In the example shown in FIG. 18D, a shift angle between the adjacent cores is set to 10 degrees or 20 degrees in terms of electrical angle. When the primary component is the sixth torque pulsation, that is, torque pulsation in a cycle of 60 degrees in terms of electrical angle, the shifting of the cores by 10 degrees or 20 degrees in terms of electrical angle allows the primary component to be shifted by one sixth of a cycle or one third of a cycle. In the skew method of shifting by one third of a cycle, a 3n-th component of the torque pulsation remains, but other components disappear. This method lessens the torque pulsation as compared to the above-mentioned general method using the reverse phases.

In the examples shown in FIGS. 18A to 18C, an excitation force is applied in the axial direction in driving the motor. In the method shown in FIG. 18D, the excitation force is not generated axially. Thus, no vibration is applied to the external part of the rotary electric machine, which makes the rotary electric machine silent. Also, in this case, when the primary component of the torque pulsation is small and the secondary component thereof is predominant, skewing may preferably be performed by 10 degrees, and not 20 degrees. In anyone of cases shown in FIGS. 18A to 18D, the total axial thickness of the cores with the same shift angle is equal regardless of the shift angle. As long as the total axial thickness of the cores with the same shift angle is constant regardless of the shift angle, the method for shifting cores is not limited to the methods shown in FIGS. 18A to 18D, and may be any combination of methods for shifting cores.

In the above description, the stator core, that is, the permanent magnet 254 is skewed thereby to reduce the sixth toque pulsation of the three-phase motor, for simplification. The inventors considered that the pulsation due to the rotating magnetic flux made by the stator current using the magnetic air gaps 258 can be handled by introducing the above-mentioned concept of the means for skewing with skew by the magnet (see FIG. 18).

For example, the inventors have found through studies that the combination of the above-mentioned cores 301 and 302 shown in FIG. 5 can be basically applied to the case shown in FIG. 18A. That is, as shown in FIG. 13, the cycle and amplitude of torque pulsation generated in the cores 301 and 302 with the magnetic air gaps 258a and 258b formed therein may be actually examined, and the positions of the cores 301 and 302 may be found in such a manner that the torque pulsations due to the respective cores have reverse phases from each other, or are shifted from each other by one third of a cycle. Then, the cores 301 and 302 may be disposed such that the total torque pulsation is reduced.

Furthermore, the conventional stage skew for axially dividing the magnet and the simulated skew for shifting the magnetic air gaps 258 provided in the auxiliary salient pole 259 may be used together. For example, the primary component of the torque pulsation in a cycle of 60 degrees is electrically cancelled by shifting the permanent magnets 254 from each other by 30 degrees in terms of electrical angle, and the secondary component of the torque pulsation in a cycle of 30 degrees is cancelled by the simulated skew of the magnetic air gaps 258.

Figure 19A:
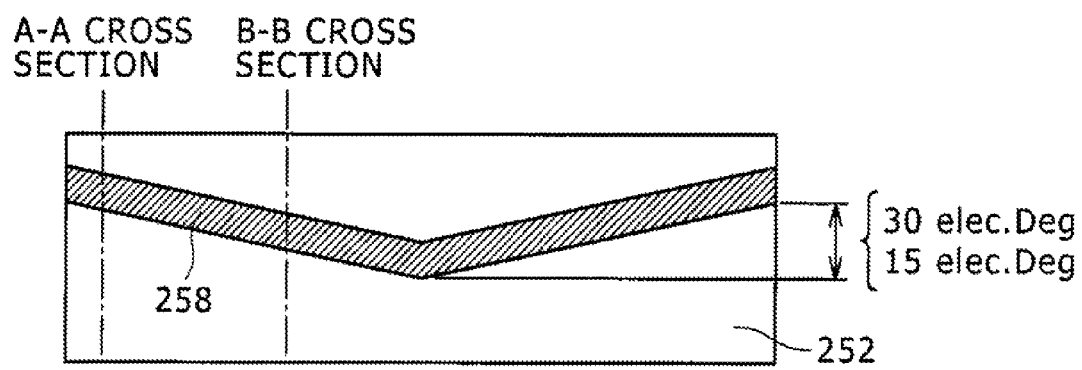
FIG. 19A shows a continuous skew when a skew direction is reversed in midstream.
Figure 19B:
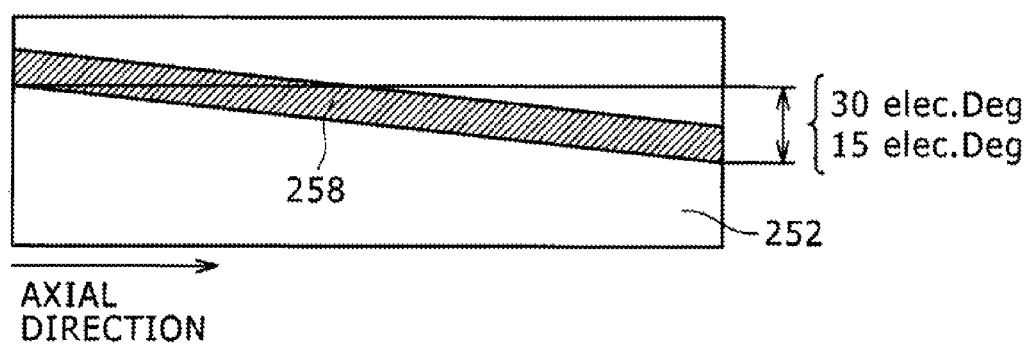
FIG. 19B shows a continuous skew when the skew direction is fixed to one direction.

In the above-mentioned embodiment, the skew structure for shifting in stages as shown in FIG. 18 is employed so as to prepare only one type of mold for forming the rotor core 252 using a silicon steel plate. Alternatively, as shown in FIGS. 19A and 19B, a skew structure may be taken so as to have the continuously shifted magnetic air gap 258. In the figure, the case of 60 degrees is to reduce the odd-numbered component of the torque pulsation, while the case of 30 degrees is to reduce the even-numbered component of the pulsation. In any case, the magnetic air gap 258 is shifted so as to continuously change the cycle of the pulsation from zero to one cycle.

Figure 20:
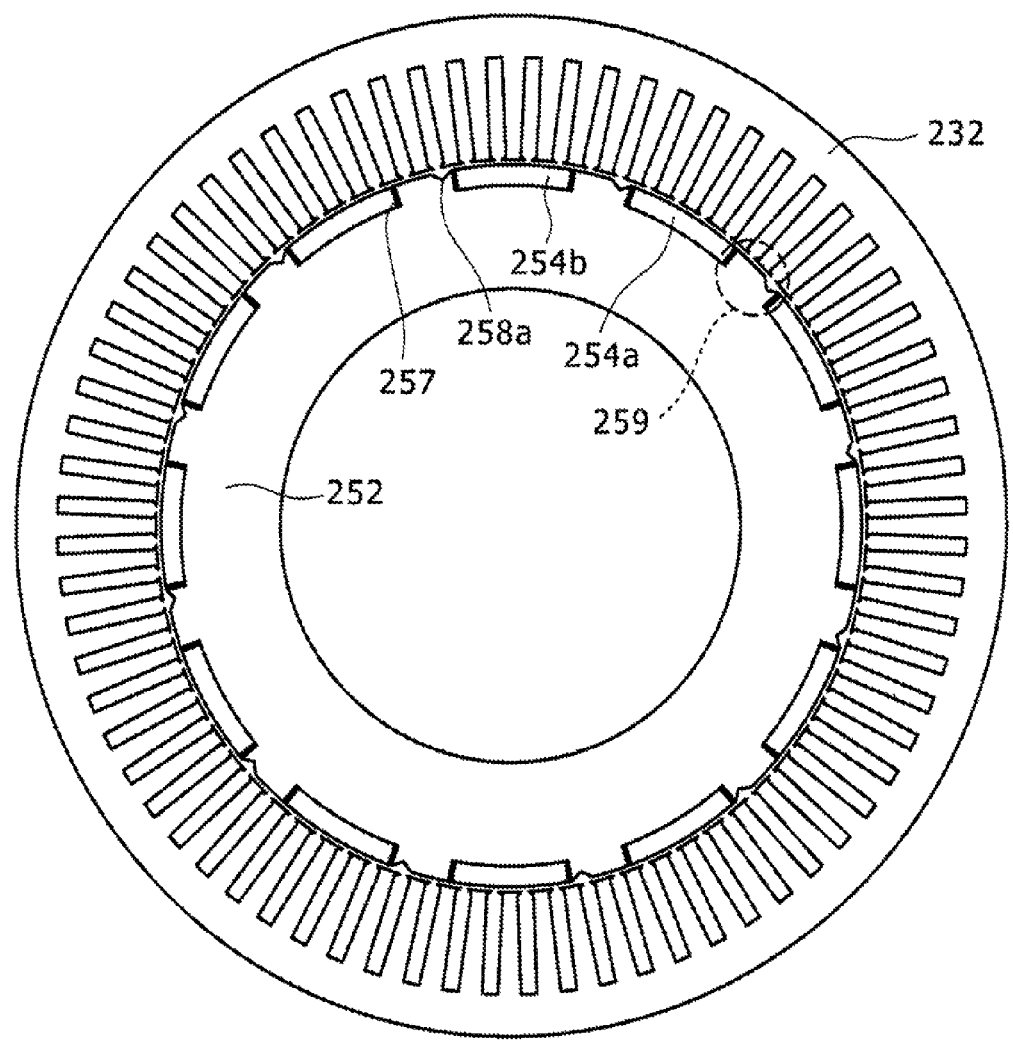
FIG. 20 is a sectional view of the rotor 250 of a surface magnet type.

FIG. 20 shows the case where this embodiment is applied to a surface magnet type rotor. A method for fixing the magnets 254 (254a, 254b) to the rotor core 252 may include fixing with an adhesive. Another method may include holding a tape on the surface of a rotor by winding the tape on the rotor surface. An auxiliary salient pole 259 is provided between the permanent magnets 254, and a slot is formed as a magnetic air gap 258a in a position shifted from the center of the auxiliary salient pole 259 (on the q axis). FIG. 20 shows a section of the rotor taken along the line A-A. In the section taken along the line B-B, a magnetic air gap (slot) 258b is formed in a position symmetric to the magnetic air gap 258a, like the above-mentioned embodiment.

In the example shown in FIG. 20, the slot is provided in the auxiliary salient pole, but the auxiliary salient pole itself may be bilaterally asymmetric. The sectional shape of the permanent magnet 254 is an arc shape on the stator core side, but maybe linear. Conventionally, such a surface magnet type motor reduces the torque pulsation by means of a curvature radius of the permanent magnet 254 on the outer peripheral side. Provision of the magnetic air gaps 258 of this embodiment in such a motor structure can reduce higher level torque pulsation.

Figure 21:
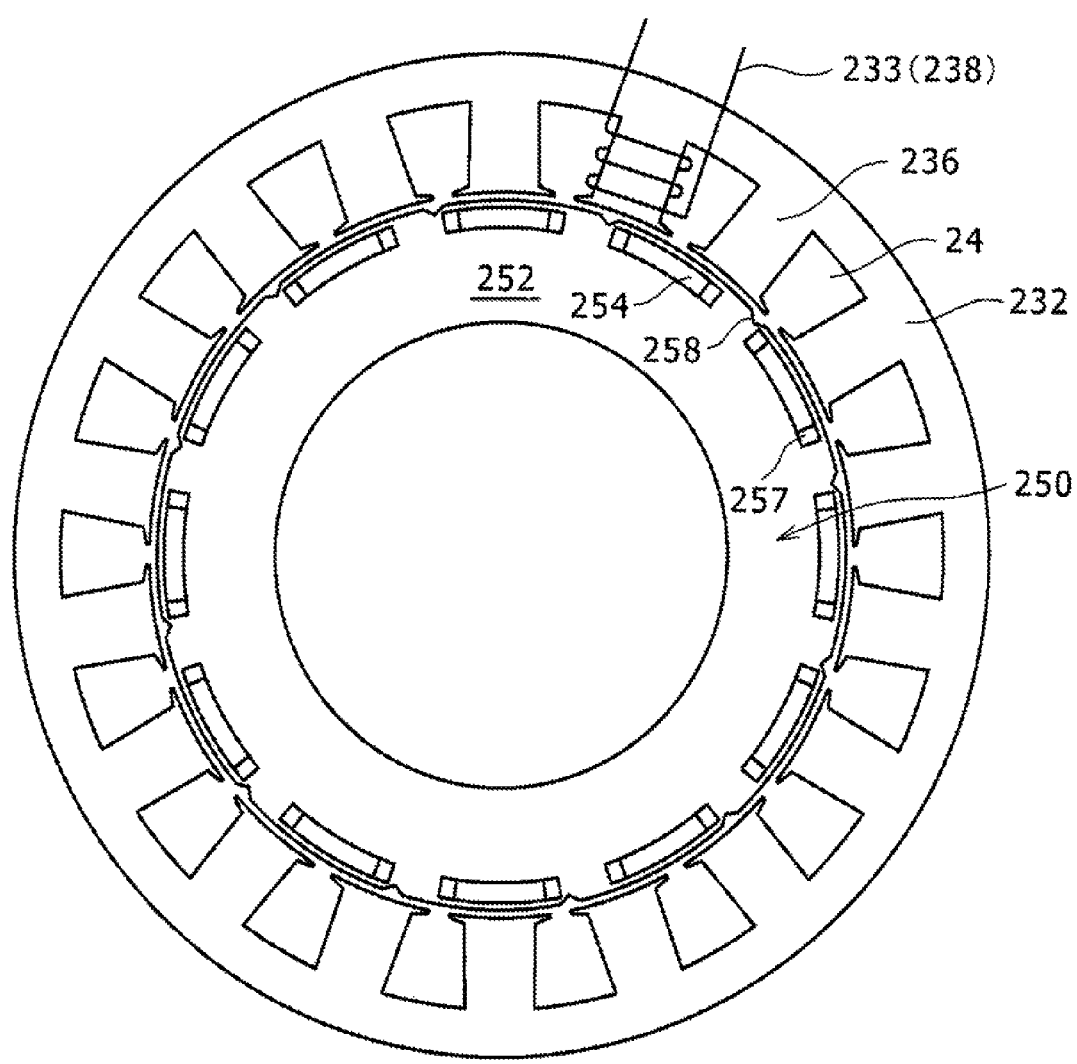
FIG. 21 is a sectional view showing the stator 232 and the rotor 250 in the case of concentrated winding.

FIG. 21 shows the concentrated winding of stator windings 238 shown as the example in FIG. 20. Torque pulsation in this embodiment depends on the shape of the rotor 250. Thus, even the concentrated winding system, which is different from the above-mentioned winding system on the stator side, can reduce the torque pulsation, like the case described above.

(Explanation of Effects)

The above-mentioned rotary electric machine of this embodiment has the following operation and effects.

(1) The magnetic air gaps 258a and 258b are provided in the auxiliary salient poles 259. The magnetic air gaps 258a and 258b are arranged to be shifted from each other such that the torque pulsations caused by the gaps 258a and 258b in energization cancel each other as shown in FIG. 13. As a result, the torque pulsation of the rotary electric machine can be reduced in energization. In particular, the rotary electric machine of this embodiment that can reduce the torque pulsation in energization can be used as a motor for traveling an electric vehicle or the like to reduce vibration and noise in low-speed acceleration, which can provide the electric vehicle with good ride quality and high level of silence.

(2) As shown in FIG. 9, in non-energization, the magnetic air gap 258 has little influence on the magnetic flux. Thus, measures for reducing the cogging torque due to the magnetic flux of the permanent magnet 254, and measures for reducing the torque pulsation in energization can be independently taken.

As a result, both optimization of the magnet torque and reduction of the torque pulsation in energization can be achieved so as to lessen the cogging torque and increase the torque in energization. Conventionally, the magnet is constructed so as to maximize the torque, and thereafter the skew or the like is provided so as to lessen the cogging torque, which results in reduced torque (magnet torque). However, this embodiment can avoid reduction of torque caused due to reduction of the torque pulsation.

(3) As mentioned above, since reduction of the magnet torque together with the reduction of torque pulsation can be prevented, the magnet can be made as small as possible, which can achieve reduction in size and cost of the rotary electric machine.

(4) Since the positions of the magnetic air gaps 258a and 258b provided in the auxiliary salient poles 259 are shifted from each other to reduce the torque pulsation in energization, the permanent magnet 254 does not need to be axially divided into a plurality of parts and magnetized while being skewed, unlike the conventional skew structure. A rare-earth magnet, typified by a neodymium-based magnet, for example, is used for the permanent magnet 254, and is subjected to grinding to be shaped. Thus, the accuracy for preventing a manufacturing error is enhanced, which directly leads to an increase in cost. Thus, according to this embodiment which does not need dividing the magnet in the axial direction, the cost of the rotary electric motor can be reduced. Thus, the accumulation of tolerances of the magnets does not increase variations in properties of the rotary electric machines, and does not deteriorate yield ratios of the machines. In this way, this embodiment can achieve improvement of productivity of the rotary electric machine, and also reduction in manufacturing cost.

(5) A leakage of magnetic flux of the field pole can be reduced by the magnetic air gap 257 to improve the efficiency of the rotary electric machine. As mentioned above, the magnetic air gap 257 has an effect of reducing the cogging torque. Further, the magnetic air gap 257 has another effect of reducing the leakage of magnetic flux from the permanent magnet. Now, the effect will be described using FIG. 9. The permanent magnets 254s and 254b has an N/S pole on the stator 230 side, and a reverse S/N pole on the center side of the rotor. A magnetic circuit for short-circuiting of a portion between the poles of the permanent magnet 254 via the auxiliary salient pole 259 can be generated. The short-circuited magnetic flux does not contribute to the magnet torque, leading to reduction in efficiency of the rotary electric machine. Provision of the magnetic air gap 257 can form a narrow and long magnetic passage (magnetic bridge) between the magnetic air gap 257 and the outer periphery of the rotor along the direction of rotation (in the peripheral direction). As shown in FIG. 9, the provision of the magnetic air gap 257 can form the magnetic bridge, thereby reducing leakage magnetic fluxes. The sectional area of the magnetic circuit of the magnetic bridge is small, and thus the magnetic circuit is brought into a magnetic saturation state, whereby the amount of magnetic reflux passing through the magnetic bridge can be reduced thereby to improve the efficiency of the rotary electric machine. The amount of magnetic reflux passing through the magnetic bridge can be decreased, which makes the influence of the magnetic air gap 258 on the cogging torque very small. The magnetic air gap 257 can have various shapes, and further can have a shape with a curved line. This shape is formed so as to avoid concentration of mechanical stress, whereby the mechanical stress is only slightly concentrated, so that the sectional area of the shape can be made small to reduce the leakage magnetic flux.

Second Embodiment

Figure 23A:
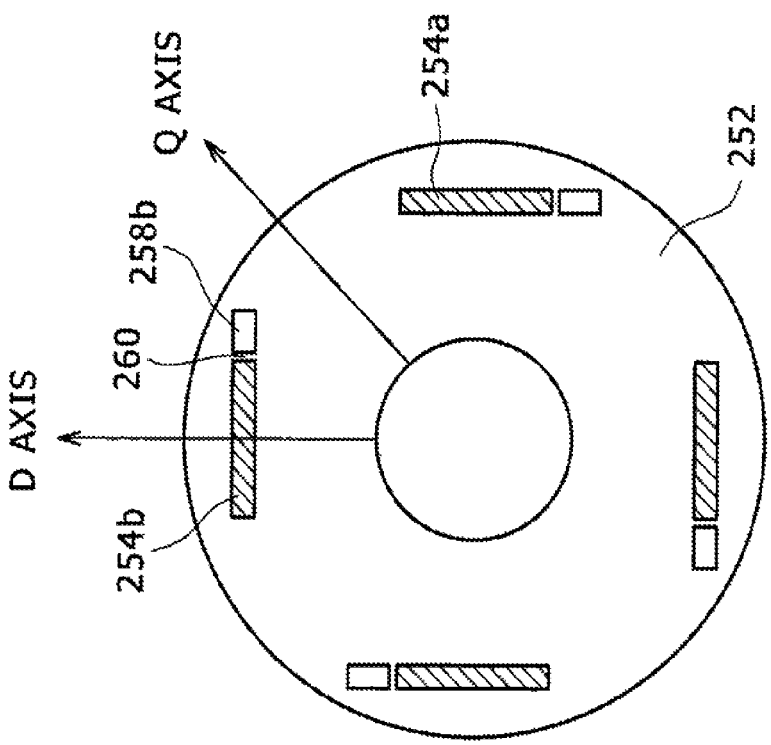
FIG. 23A is a sectional view showing another example of the rotor 250 according to the second embodiment, taken along the line A-A.
Figure 23B:
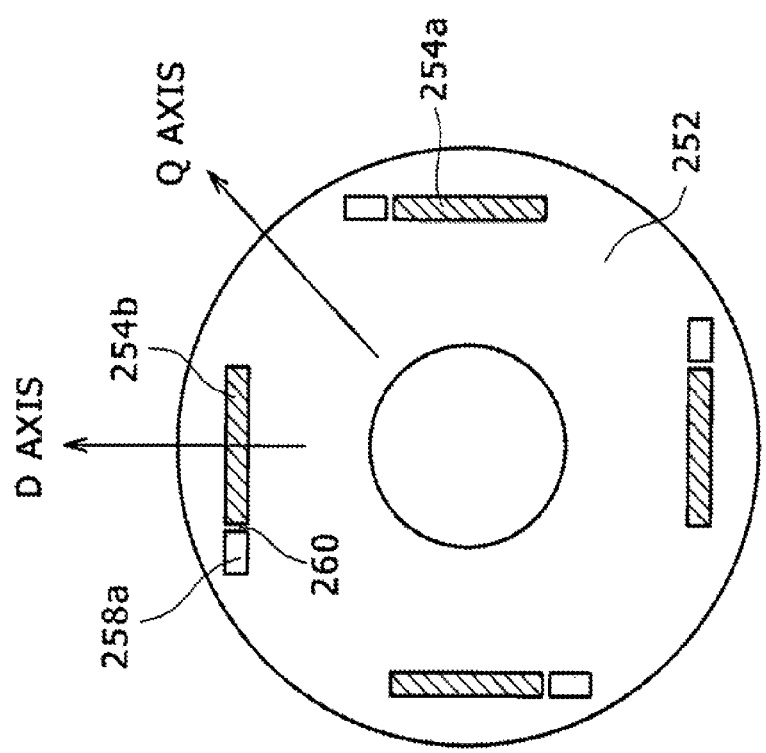
FIG. 23B is a sectional view showing another example of the rotor 250 according to the second embodiment, taken along the line B-B.
Figure 24:
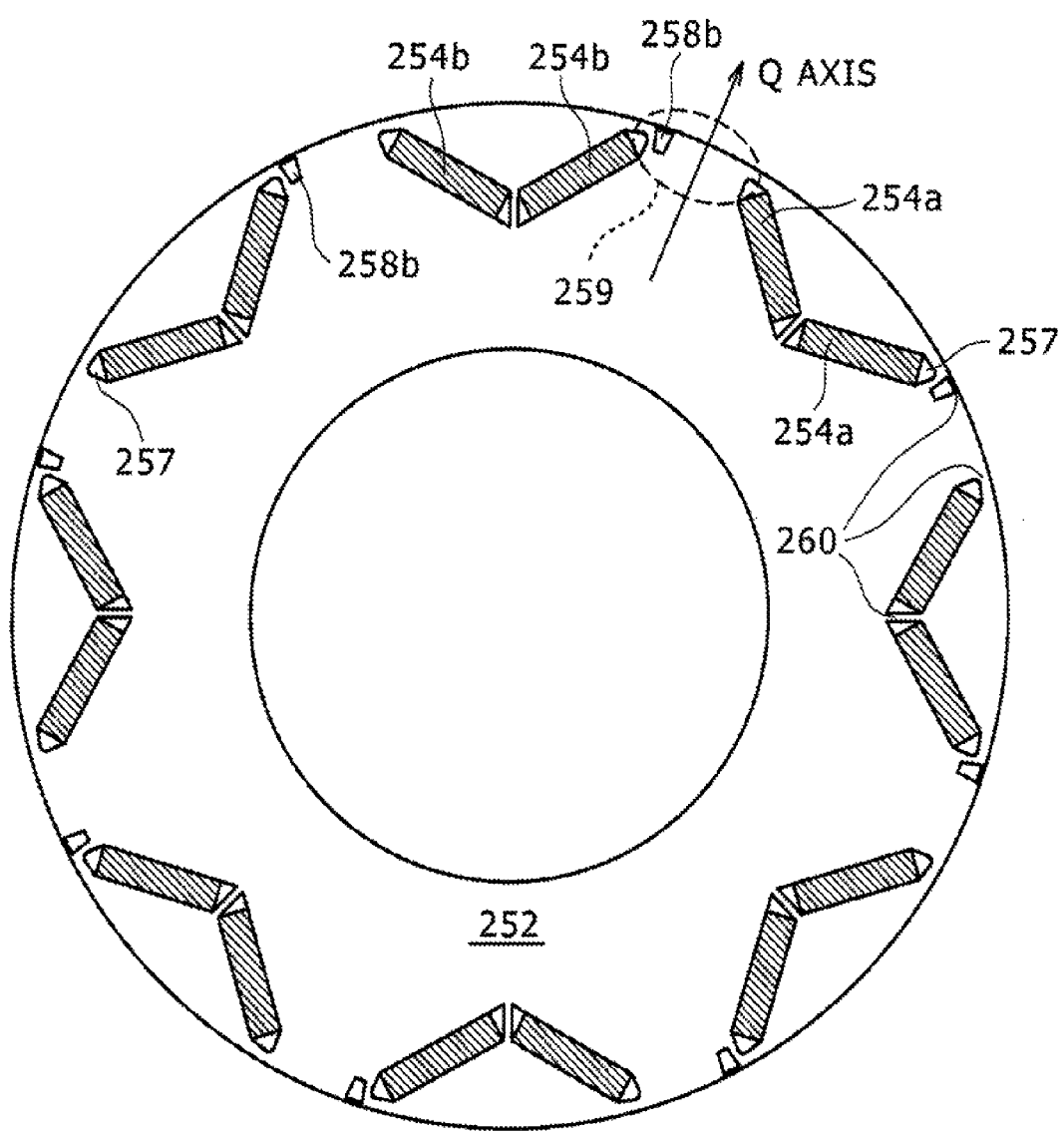
FIG. 24 is a sectional view of the rotor 250 including a pair of permanent magnets 254 arranged in a V-like shape.

FIGS. 22 to 24 are diagrams for explaining the second embodiment of the invention.

FIG. 22A is a sectional view of the rotor 250 corresponding to the section taken along the line A-A shown in FIG. 6A, and FIG. 22B is a sectional view of the rotor 250 corresponding to the section taken along the line B-B shown in FIG. 6B. That is, also in the second embodiment, the rotor core 252 is constructed of three cores as shown in FIG. 5. FIG. 22A shows the section of the core 301, and the FIG. 22B shows the section of the core 302. In the above example shown in FIG. 6, the magnetic air gaps 258 are formed as the slot on the surface of the rotor core 252. In the second embodiment, the air gaps 258 are formed inside the rotor core 252.

The sectional shape of the permanent magnets 245 (254a, 254b) is rectangular, and the magnetic air gap 258 is provided so as to be in contact with one side of the field pole made by the permanent magnets 245 (254a, 254b). In FIG. 22A, a magnetic air gap 258a is provided so as to be in contact with one side of the permanent magnet 254 in the circumferential direction. In FIG. 22B, a magnetic air gap 258b is provided so as to be in contact with the other side of the permanent magnet 254 in the circumferential direction. Also in this case, the permanent magnet 254 is located at the center on the d axis. The magnetic air gap 258a is disposed shifted toward the permanent magnet 254a with respect to the center (q axis) of the auxiliary salient pole 259, and the magnetic air gap 258b is disposed shifted toward the permanent magnet 254b with respect to the q axis.

Also, in the second embodiment, different torque pulsations are generated in the core 301 and in the core 302. These pulsations act to cancel each other, thereby enabling reduction of the total torque pulsation. Like the first embodiment, the magnetic air gap 258 is formed in the auxiliary salient pole 259, which has little influence on the cogging torque. That is, the magnetic air gap 258 is provided to suppress the influence of the cogging torque on reduction of the pulsation, and thus can reduce the torque pulsation in energization substantially separately from the cogging torque pulsation. The use of the permanent magnet 254 having a rectangular section can reduce a processing cost of magnets.

The example shown in FIG. 23 is a modified one of the rotor 250 shown in FIG. 22.

In the example shown in FIG. 22, one of the sides of the permanent magnet 254 is in contact with the rotor core 252, and the other of the sides thereof is in contact with the magnetic air gap 258. Thus, the other side of the permanent magnet in contact with the magnetic air gap 258 allows the short-circuited portion of the magnet magnetic flux to be shifted toward the magnetic air gap 258, so that the center of the magnet is shifted from the center of the magnetic flux of the magnet. In the example shown in FIG. 23, a bridge 260 constructed of the rotor core 252 is provided between the permanent magnet 254 and the magnetic air gap 258. In this way, the magnetic flux is also short-circuited by the bridge 260 on the magnetic air gap side, thus allowing the magnetic flux to leak in the same manner as that on the other side of the permanent magnet 254. Thus, routes for short-circuiting the magnetic fluxes on both sides of the permanent magnet 254 are the same to each other, and thus can more reduce the influences of the magnetic air gap 258 on the cogging torque and induced voltage.

FIG. 24 is a diagram of another example of the second embodiment, showing a plurality of permanent magnets 245 provided on the respective poles of the rotor 250. The rotor 250 and the entire rotary electric machine including the stator and the sensor have the same structures and also the same basic operations and effects as those described above, except for the permanent magnets 254a and 254b constituting the respective field poles, or the magnetic air gap 257 for reducing the cogging torque or leakage magnetic flux, or the magnetic air gap 258b for reducing pulsation due to the rotating magnetic field made by a stator current. In the example shown in FIG. 24, the permanent magnets for forming field poles are constructed of a plurality of permanent magnets 254 (two magnets in this embodiment) disposed in a V shape. The sectional view shown in FIG. 23 corresponds to the sectional view taken along the line B-B shown in FIG. 6B. A pair of permanent magnets 254a and a pair of permanent magnets 254b correspond to the permanent magnets 254a and 254b shown in FIG. 6B. A core portion between a magnetic pole made by each of the permanent magnets 254a arranged in the V shape and a magnetic pole made by each of the adjacent permanent magnets 254b arranged in the V shape serves as the auxiliary salient pole 259, and the q axis is located at the center of the auxiliary salient pole 259.

Magnetic air gaps 257 for treating cogging torque are respectively provided on both ends in the circumferential direction of the permanent magnet 254 having a rectangular section, like the rotor 250 shown in FIG. 6. Also, in the rotor 250 shown in FIG. 24, the magnetic air gap 258b is provided in the rotor core 252, and is arranged shifted toward one side (left side) in the rotation direction (circumferential direction) with respect to the q axis provided at the center of the auxiliary salient pole 259. The effect of suppressing the torque pulsation by the magnetic air gap 258b becomes higher as the magnetic air gap 258b is located closer to the surface of the rotor core 252. The rotor core is disposed in the magnetic air gap 258b to be shifted toward one side (left side) in the rotation direction with respect to the q axis provided at the center of the auxiliary salient pole 259. A rotor core (not shown) is disposed in the magnetic air gap 258a to be shifted toward the other side (right side) in the rotation direction with respect to the q axis provided at the center of the auxiliary salient pole 259. These rotor cores are arranged along the rotation axis as explained in FIGS. 18 and 19. Thus, the pulsations generated in the rotor cores are cancelled each other, which can reduce the total pulsation.

In the example shown in FIG. 24, the auxiliary salient pole 259 is widened, so that the reluctance torque can be used more effectively. A magnet hole for accommodating therein the permanent magnet 254 is formed to make the bridge 260 narrow such that the magnetic flux of the permanent magnet 254 does not run around and enter the core. Although the magnetic air gap 258b is provided in the rotor core 252, a concave portion (slot) may be provided as the magnetic air gap 258b on the surface of the rotor core 252, like the first embodiment. The structure having the section as shown in the sectional view taken along the line A-A is the same as the section shown in the sectional view taken along the line B-B in FIG. 24, except that the magnetic air gap 258a is provided in a position symmetric to the q axis. Thus, as mentioned above, the description and illustration thereof will be omitted.

In other example, the V shaped magnet structure includes doubly superimposed magnets. The magnetic air gaps 258 are arranged shifted in the auxiliary salient pole 259 with respect to the q axis to reduce the torque pulsation. This effect does not apparently change regardless of the arrangement of the permanent magnets 254. In FIG. 24, a magnetic air gap 258a is provided adjacent to the magnetic air gap 257. A slot like the first embodiment may be provided, or the magnetic air gap 257 and the magnet air gap 258a may be integrated.

Third Embodiment

Figure 25B:
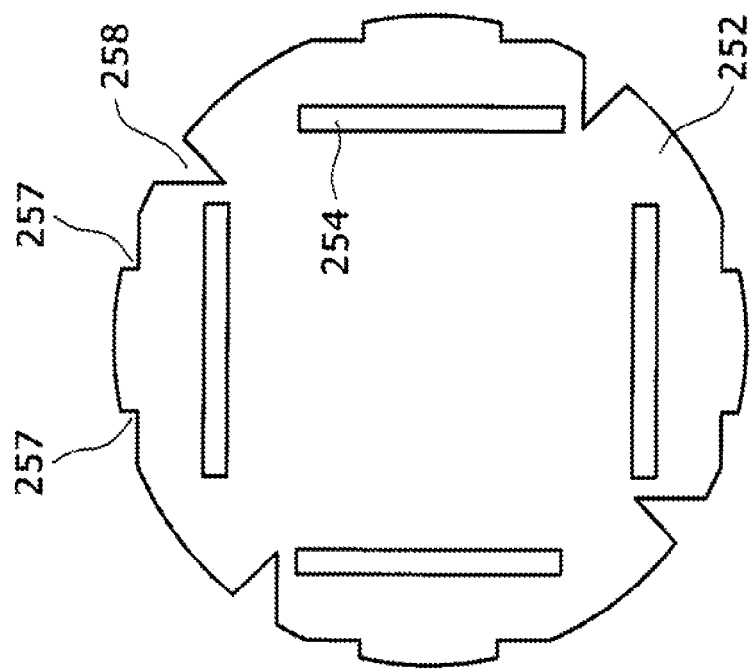
FIG. 25B is a sectional view of the rotor 250 according to the third embodiment, taken along the line B-B.
Figure 25A:
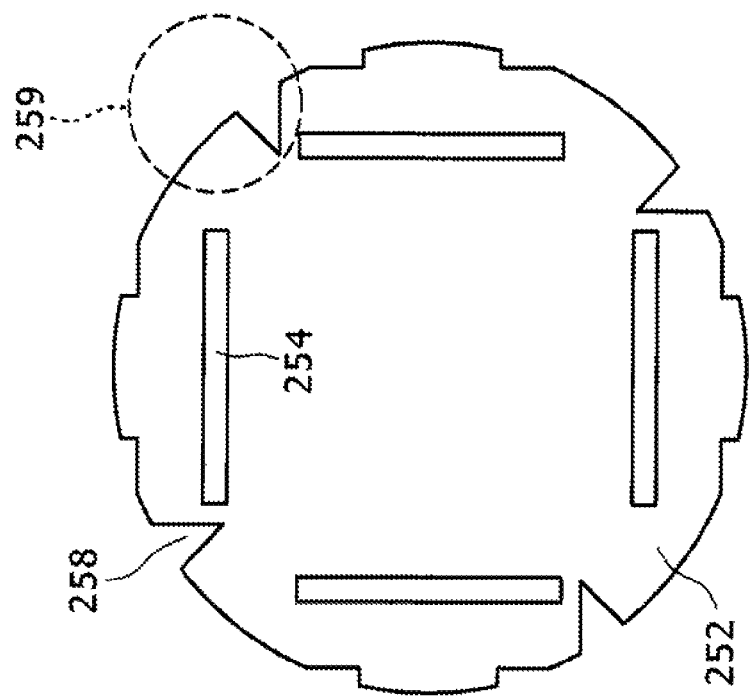
FIG. 25A is a sectional view of the rotor 250 according to a third embodiment, taken along the line A-A.

FIG. 25 shows a rotor 250 according to a third embodiment. FIG. 25A is a sectional view corresponding to the sectional view taken along the line A-A shown in FIG. 6A, and FIG. 25B is a sectional view corresponding to the sectional view taken along the line B-B shown in FIG. 6B. In the example shown in FIG. 25, two kinds of magnetic air gaps per one pole are provided. That is, a pair of magnetic air gaps 251 are also provided in the core on the outer peripheral side of the magnet, in addition to the magnetic air gaps 258 in the auxiliary salient pole 259. The magnetic air gaps 251 are symmetrically provided with respect to the d axis passing through the center of the permanent magnet. The magnetic air gaps 251 may be provided asymmetrically. The magnetic air gap 251 is mainly provided for reducing the cogging torque, and thus is disposed in the core on the outer peripheral side of the magnet through which the magnet flux passes. Such an arrangement can respectively reduce the primary and secondary torque pulsations, and also the cogging torque and the torque pulsation in energization.

Figure 26:
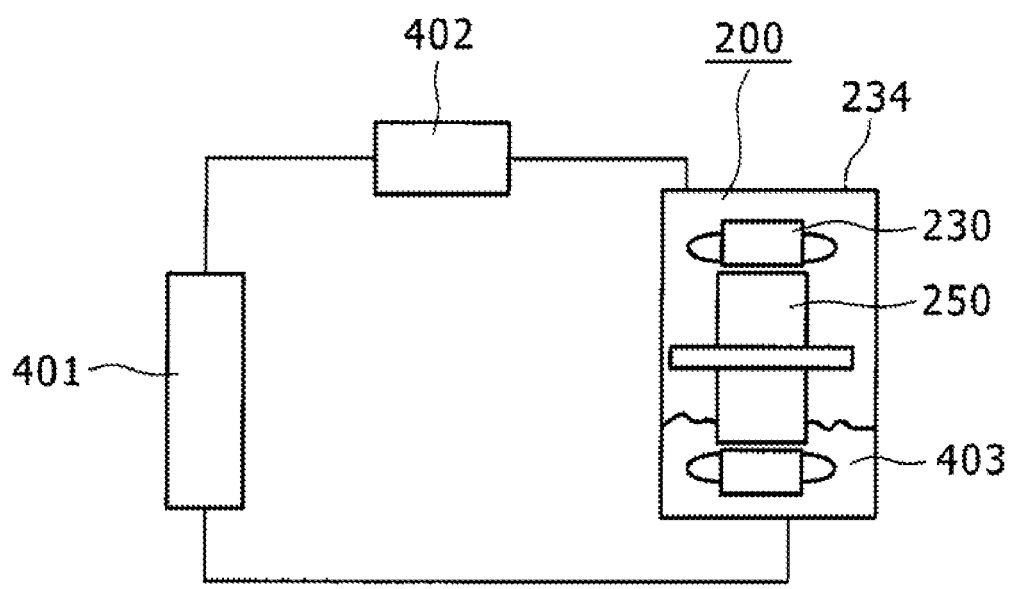
FIG. 26 is a sectional view of a rotary electric machine having oil 403 for cooling in a housing 234.

The rotor 250 having slots formed as the magnetic air gap 258 on the surface of the rotor core 252 can be cooled through the slots. As shown in FIG. 26, the rotary electric machine 200 is sealed in the housing 234, in which oil 403 for cooling is charged so as to slightly cover the rotor 250. The oil 403 circulates by a pump 402 for cooling and is cooled by a radiator 401. The rotor 250 has slots 257 which allow the oil to penetrate the core 302 located at the axial center shown in FIG. 5. With the slant slots (magnetic air gaps 258) shown in FIG. 24, the rotation of the rotor 250 allows the oil to enter the rotor thereby to cool the axial center of the rotor 250. A neodymium-based magnet has a low heatproof temperature of about 200° C., and thus demagnetized at high temperatures, which is a problem from the viewpoint of downsizing. Thus, the provision of such a cooling route is effective for downsizing the motor for the hybrid vehicle or the electric vehicle. Two or more types of magnetic air gaps 258 may be formed in the auxiliary salient pole 259. This can enhance flexibility of reduction of torque pulsation, and further can reduce the torque pulsation in more detail.

As mentioned above, in the embedded magnet type rotary electric machine of this embodiment using reluctance torque generated by the auxiliary salient pole 259, the cores with the magnetic air gaps 258 are laminated in the direction of lamination in respective positions shifted from the q axis which is the center of the auxiliary salient pole 259 to constitute the rotor. The rotary electric machine can reduce the torque pulsation in energization separately from the reduction of pulsation of the cogging torque. As a result, such a rotary electric machine is applied to the motor for traveling the electric vehicle or hybrid vehicle, thus resulting in less vibration and noise in low-speed acceleration, thereby improving the ride quality and the level of silence.

Fourth Embodiment

Figure 27:
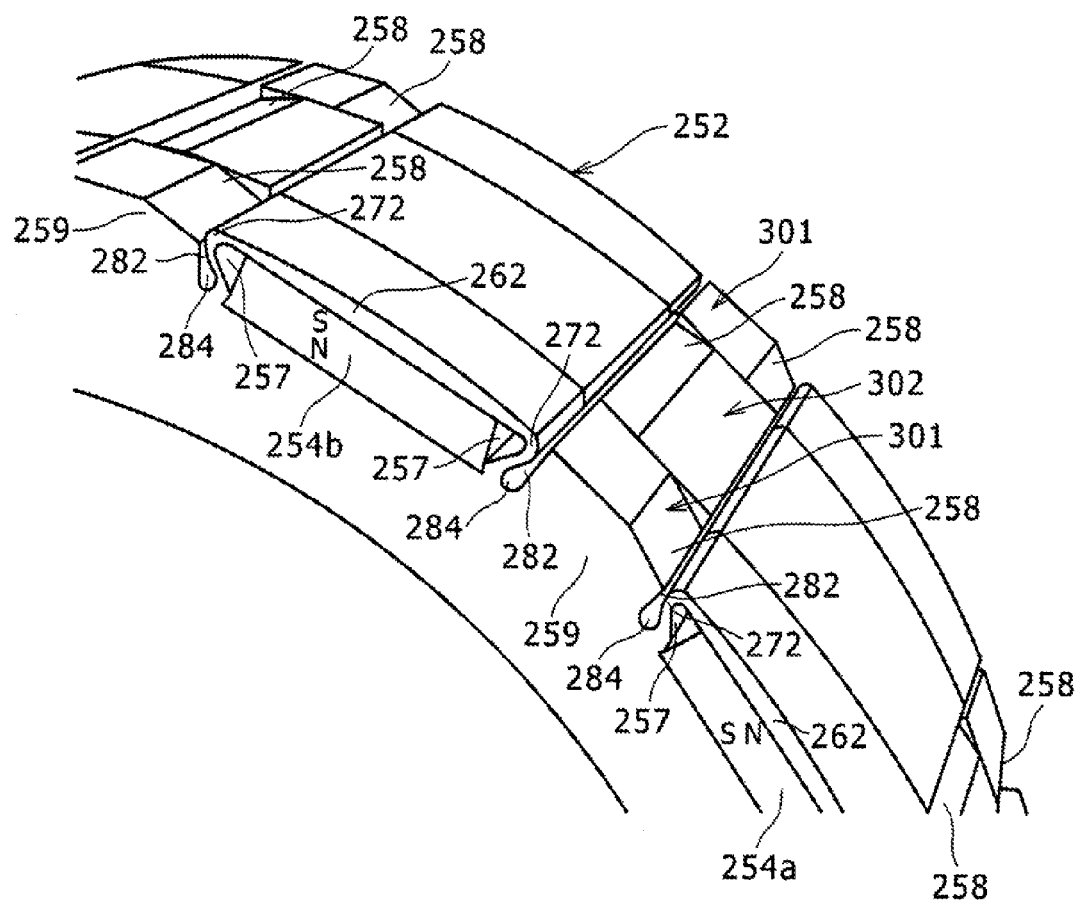
FIG. 27 is a diagram showing an external appearance of a rotor core 252 according to a fourth embodiment.

A fourth embodiment of the invention will be described below using FIGS. 27 to 32. FIG. 27 is a partial diagram of the outer appearance of a rotor core 252. The rotary electric machine includes a core 301 having the rotor core 252 and a magnetic air gap (cutout) 258 formed on one side thereof in the rotation direction with respect to the center of the auxiliary salient pole 259, and a core 302 having a magnetic air gap (cutout) 258 formed on the other end in the rotation direction with respect to the center of the auxiliary salient pole 259. As described in FIG. 5, the length of the core 302 in the direction of the rotor is about twice as long as that of the core 301. The rotary electric machine structure is not limited thereto, and the shape and combination of the cores may be modified as explained with reference to FIGS. 17 to 19. Permanent magnets 254a and 254b inserted into the cores 301 and 302 have substantially the same shape in the substantially same rotation position. An integrated permanent magnet 254 may be inserted. Alternatively, a permanent magnet may be divided regardless of the cores 301 and 302. The hole for insertion of the permanent magnet 254 and the magnetic air gap 257 in the core 301 have substantially the same respective shapes and rotation positions as those of the hole and the magnetic air gap 257 in the core 302. These holes and air gaps are continuously formed in the direction of rotation axis.

In this embodiment, each field pole has one permanent magnet 254. Alternatively, as shown in FIG. 24, each field pole may have a plurality of permanent magnets 254. An auxiliary salient pole 259 is provided between the adjacent field poles, and the above-mentioned magnetic air gap 257, the magnetic bridge 272, and the slot 282 are further provided between the auxiliary salient pole 259 and an area between the field poles. A stator side core of each permanent magnet 254 serves as a magnet pole piece 262. The magnetic flux generated from the permanent magnet 254a is guided from the magnetic pole piece 262 formed on the stator side of the permanent magnet 254a to the stator, and then guided from the stator to the permanent magnet 254b via the magnet pole piece 262 formed on the stator side of the permanent 254b. The above-mentioned permanent magnet 254a and the permanent magnet 254b are magnified to reverse polarities as described above.

Each magnetic bridge 272 provided between each field pole and the auxiliary salient pole 259 serves to lessen the magnetic fluxes which leak from the magnetic pole piece 262 to the auxiliary salient pole 259, or serves to lessen the magnetic fluxes which leak from the magnetic pole pieces 262 to the magnetic pole on the side opposite (on the rotation axis side) to each permanent magnet 254. That is, when each magnetic bridge 272 is magnetically saturated, a magnetic resistance becomes very large, and the magnet reflux passing is restricted. Further, in this embodiment, the slot 282 is provided to make the magnetic bridge 272 long, and to have a spring property, thereby preventing concentration of stress due to a centrifugal force. The slot 282 has such a shape with a wide bottom 284 and with a curved surface similar to an arc shape as to prevent concentration of the stress.

Figure 28:
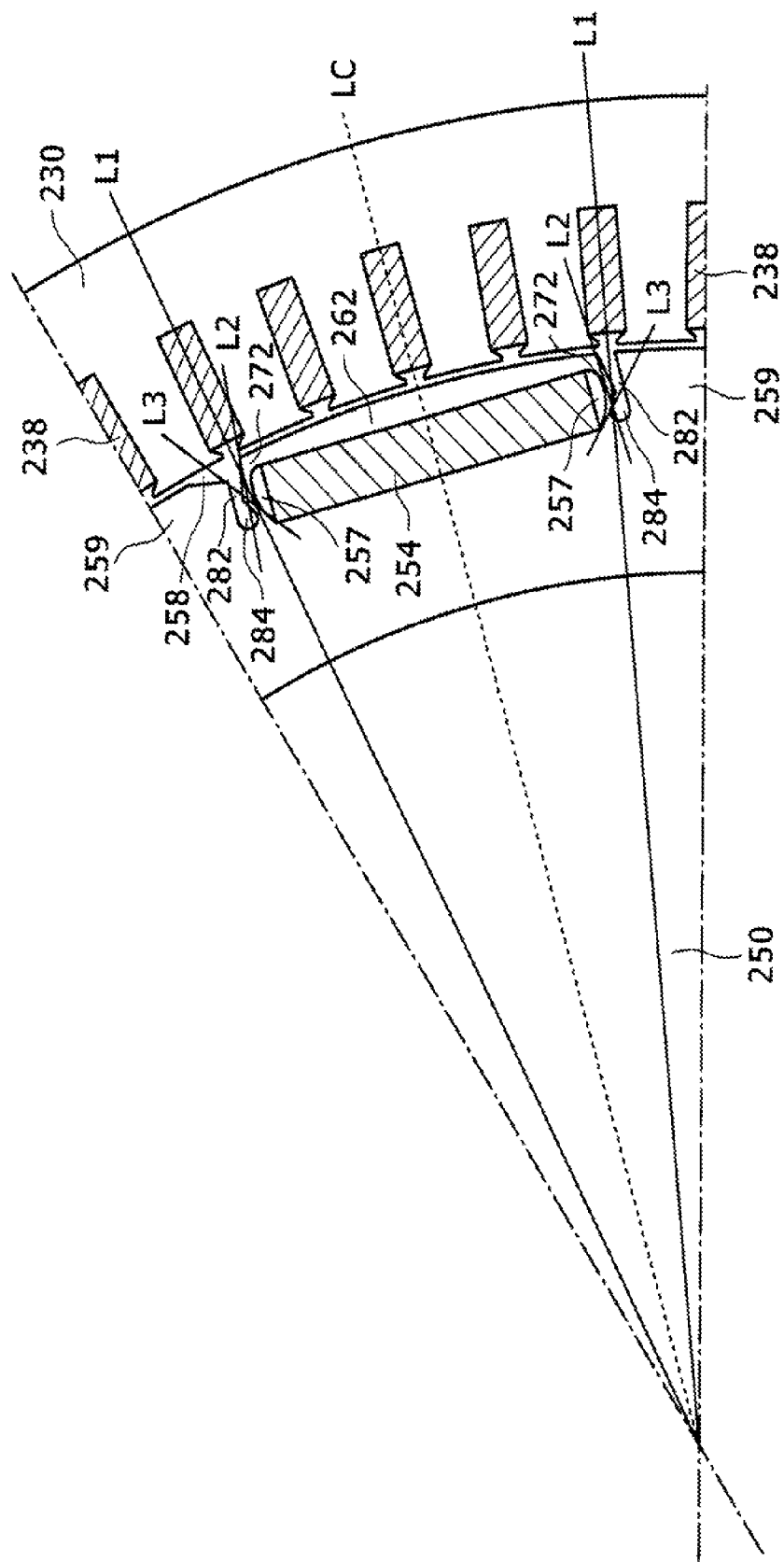
FIG. 28 is a partial sectional view of a core 301 according to the fourth embodiment.
Figure 29:
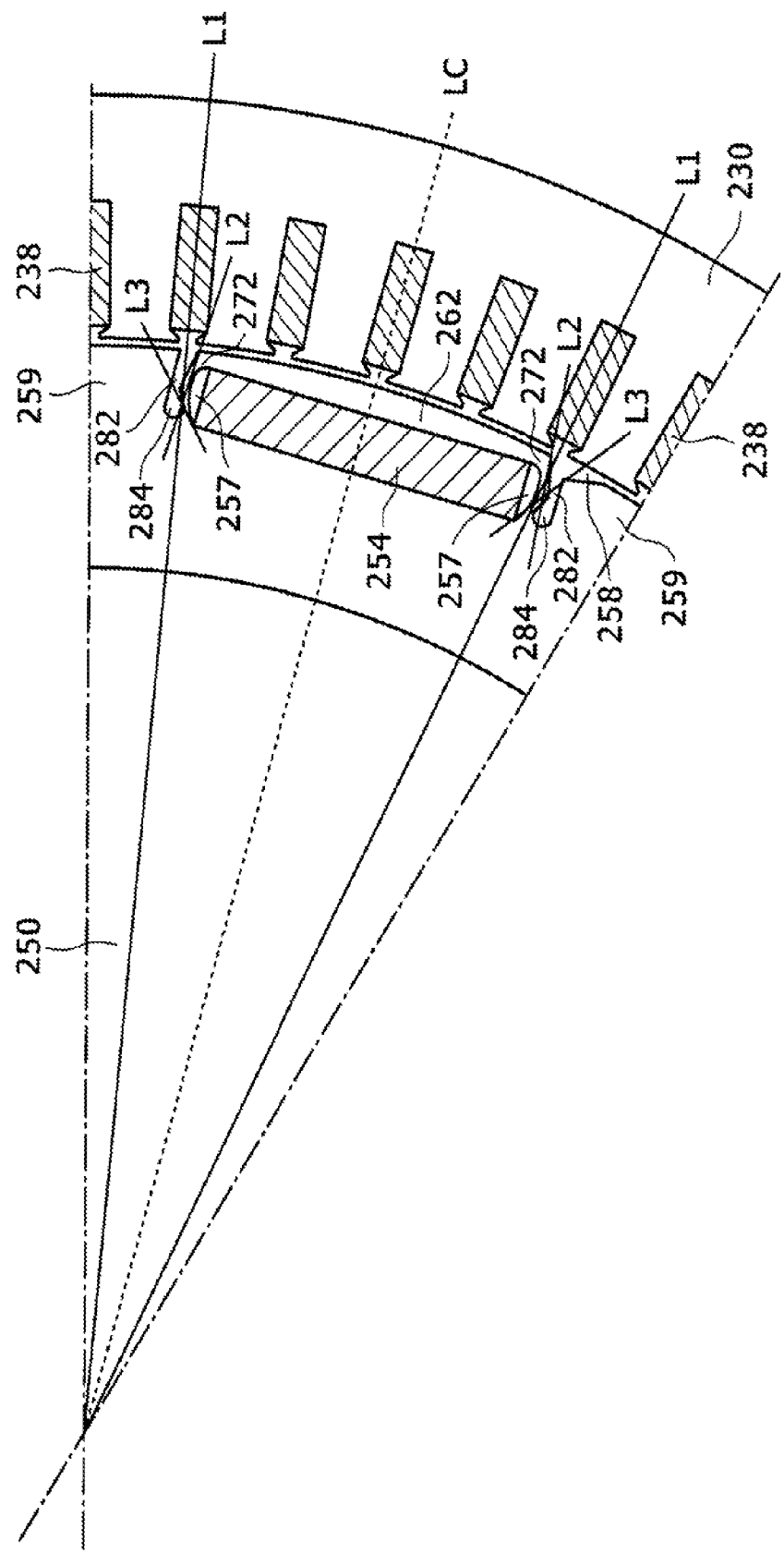
FIG. 29 is a partial sectional view of a core 302 according to the fourth embodiment.
Figure 30:
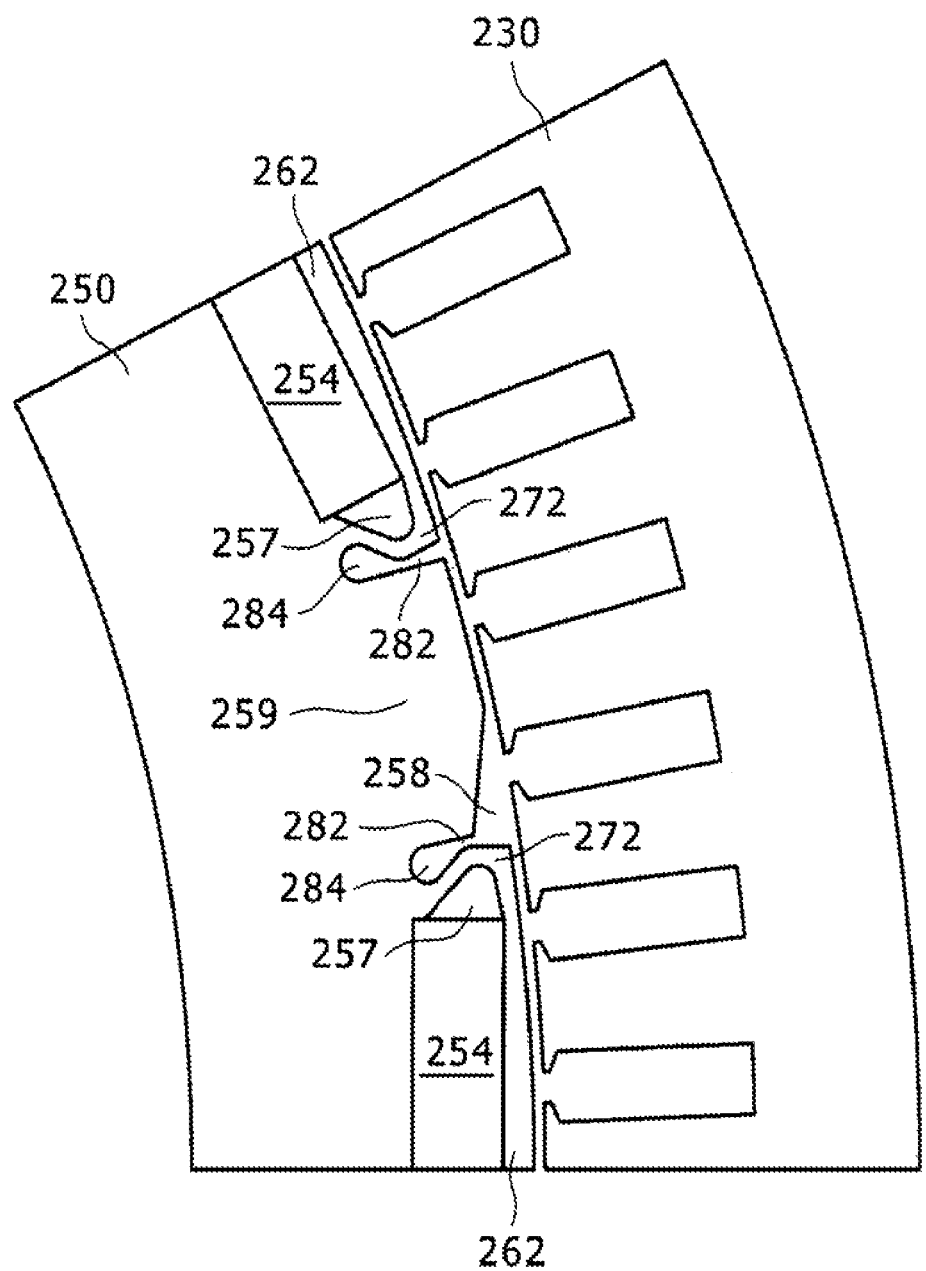
FIG. 30 is a partial sectional view of another partially different core 301 according to the fourth embodiment.
Figure 31:
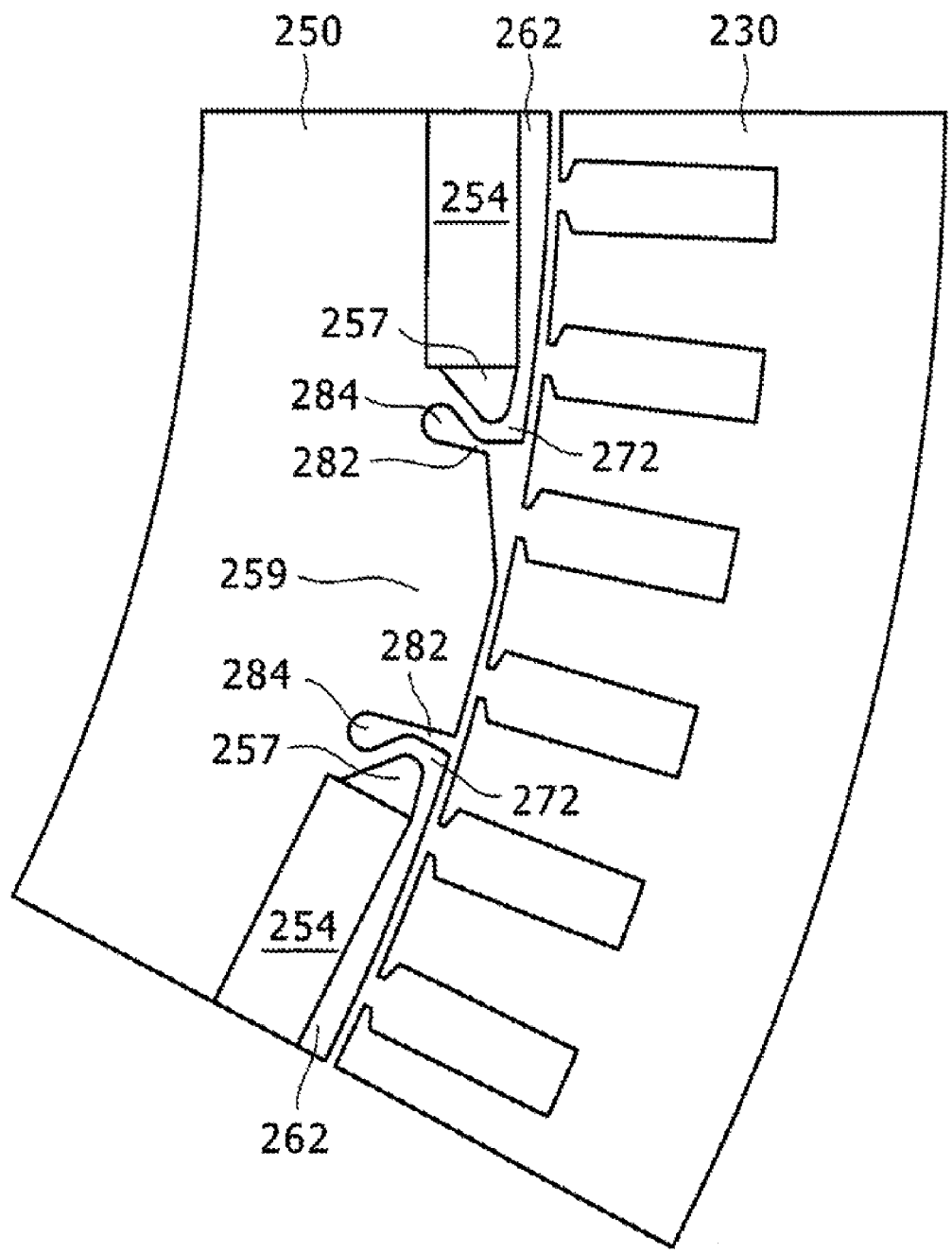
FIG. 31 is a partial sectional view of a further partially different core 302 according to the fourth embodiment.
Figure 32:
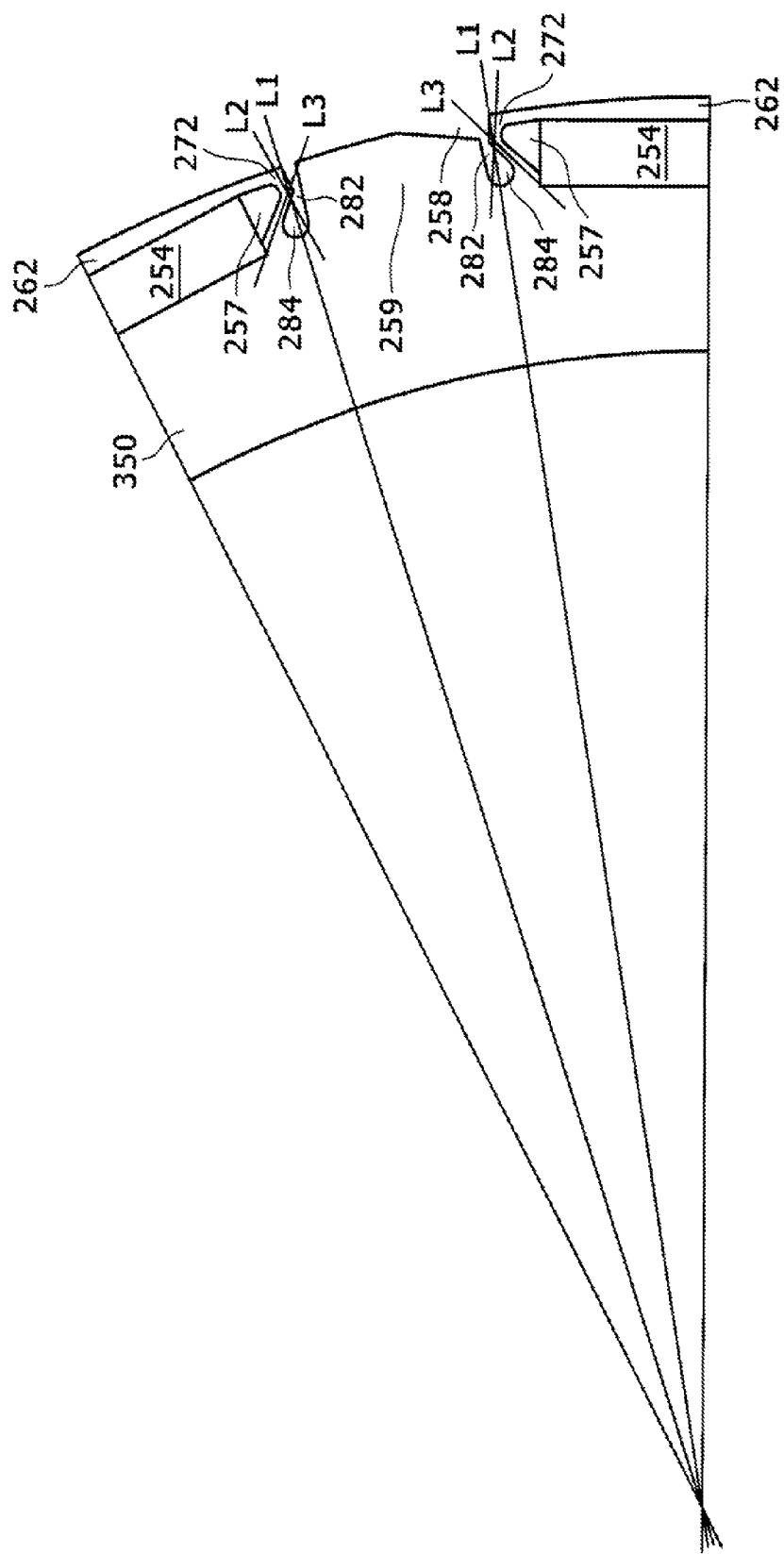
FIG. 32 is a partially explanatory diagram of the core 301 shown in FIG. 31.

FIGS. 28 and 29, and FIGS. 30 to 32 show parts of sections perpendicular to the stator and the rotation axis of the rotor. FIGS. 30 to 32 slightly differ from FIGS. 28 and 29 in the shape of the magnetic air gap 257, the magnetic bridge 272, and the slot 282, but have the same basic concept as that of FIGS. 28 and 29. FIGS. 28, 30, and 32 show the structure of the rotor core used in the core 301, and FIGS. 29 and 31 show the structure of the rotor core used in the core 302. The basic structures of FIGS. 28 to 32 are those such as described above with reference to FIG. 27. In these drawings, the magnetic air gaps 257 are respectively provided on the auxiliary salient pole 259 of the permanent magnet 254. The magnet air gap 257 extends in the rotation direction of the rotor to form the magnetic bridge 272 between the magnetic air gap 257 and the surface of the rotor. The magnetic bridge 272 leads to the magnetic pole piece 262 via the air gap. The magnetic air gap 257 extends in the rotation direction along the outer periphery of the rotor 250 thereby to relieve a drastic change in magnetic flux density in the rotation direction (circumferential direction) caused by the air gap between the rotor 230 and the rotor 250, thus reducing the cogging torque.

The slot 282 is formed on the auxiliary salient pole 259 side of the magnetic bridge 272, and the magnetic bridge 272 directed in the radial direction is formed between the magnetic air gap 257 and the slot 282. In these embodiments, the outer peripheral side of the magnetic bridge 272 directed in the radial direction is directed in the direction of the line L2 with respect to the normal line L1 extending radially through the rotation axis. The length of the magnetic air gap 257 in the radial direction is shorter than that of the permanent magnet 254 in the radial direction. The magnet bridge 272 has its direction changed along the shape of the magnetic air gap 257 on the auxiliary salient pole 259 side, and is directed in the direction of the line L3. The line L2 is directed from the permanent magnet 254 to the auxiliary salient pole 259 as the line L2 approaches the center of the rotor. That is, the line L2 is directed such that a distance from the line L1 becomes wider in the rotation direction as the line L2 approaches the center of the rotor. The line L3 is directed from the auxiliary salient polar 259 to the permanent magnet 254 as the line L3 approaches the center of the rotor. That is, the line L3 is directed such that a distance from the line L1 becomes narrower in the rotation direction as the line L3 approaches the center of the rotor. Thus, the magnetic bridge 272 changes from the direction of the line L2 to the direction of the line L3 which is directed opposed to the rotation direction with respect to the line L1.

The magnetic bridge 272 has such a shape to prevent the centrifugal force with respect to the mass of the permanent magnet 254 and the magnetic polar piece 262 from being concentrated on a part of the bridge 272, and thus has resistance to high-speed rotation. Conversely, the magnetic sectional area of the magnetic bridge 272 can be made small, which can reduce the leak magnetic flux, thereby improving the magnetic properties. The bottom 284 of the slot 282 is formed deeply in the rotation axis direction with respect to the magnetic air gap 257, and expands along the circumferential direction (rotation direction), facilitating the change from the direction of the line L2 of the magnetic bridge 272 to the direction of the line L3. Further, the concentration of stress on the slot bottom 284 can be prevented.

As shown in FIGS. 28 and 29, the magnetic air gap 258 has a relatively small cutout, but as shown in FIGS. 30 to 32, the gap 258 has a relatively large cutout. FIG. 28 to FIG. 32 precisely illustrate the sizes of the rotor, the stator, and the slot, and the relationship between the sizes of other components. The ratio $\theta a/\theta m$ of an angle $\theta a$ in the rotation direction of the auxiliary salient pole 259 sandwiched between the slots 282 to an angle $\theta m$ in the rotation direction of the permanent magnet 254 is about 0.5 ($\theta a/\theta m \approx 0.5$). The ratio $\theta c/\theta m$ of an angle $\theta c$ in the rotation direction of the magnetic air gap (cutout) 258 to the angle $\theta m$ is about 0.5 ($\theta c/\theta m \approx 0.5$). This relationship is one of examples.

The condition of $\theta a/\theta m$ is desirably more than 0.25 and less than 0.75 ($0.75 > \theta a/\theta m > 0.25$). It is desirable that $\theta c$ is larger than the opening on the rotor side of each slot of the stator, and that $\theta c/\theta m$ is smaller than 0.7 ($0.7 > \theta c/\theta m$). Further, the condition of $\theta c/\theta m$ that is less than 0.5 is optimal. The depth of the magnetic air gap 258 in the radial direction is equal to or less than a half of the width of the permanent magnet 254 in the radial direction.

The embodiments shown in FIGS. 27 to 32 have the operations and effects exhibited by the above-mentioned embodiments. That is, the magnetic air gap 258 formed on the outer periphery of the auxiliary salient pole 259 on the stator side can reduce the pulsation caused due to the rotating magnetic field generating stator current. The slot 282 is formed between the magnetic air gap 258 and the permanent magnet 254 to reduce the amount of magnetic flux passing through the magnetic air gap 258 and generated by the permanent magnet 254 to a very small level, whereby the shape of the magnetic air gap 258 has very little influence on the cogging torque. In this embodiment, the magnetic air gaps 257 in addition to the slots 282 exist, whereby the shape of the magnetic air gap 258 has very little influence on the cogging torque. This can reduce pulsation due to the stator current by the above-mentioned solving means which has a very little influence on the cogging torque.

The magnetic air gap 257 provided on the auxiliary salient pole 259 side of each field magnetic pole of the rotor 250 further has an effect of reducing the cogging torque.

The bridge 272 is formed along the magnetic air gap 257. The shape of the magnetic air gap 257 on the auxiliary salient pole 259 side can be made by a combination of curved lines, or by a combination of a curved line and a straight line. The shape of the magnetic bridge 272 on the magnetic air gap 257 side can be made into a curved shape, thereby preventing the concentration of stress. The magnetic bridge 272 is formed between the magnet air gap 257 and the slot 282, thereby enabling prevention of the concentration of stress. This can form the magnetic bridge 272 having such a shape to endure a large centrifugal force generated in the permanent magnet 254 and the magnet pole piece 262 in high-speed rotation.

In each of the above-mentioned embodiments, the motor for driving the vehicle has been described. The invention is optimally applied to the rotary electric machine for driving the vehicle, but is not limited thereto. The invention can be applied to various types of motors. Further, the invention can also be applied to various types of rotary electric machines, including a generator, such as an alternator, in addition to the motor. The invention is not limited to the embodiments described herein without departing from the features of the invention.

What is claimed is:

1. A rotary electric machine comprising:
   a stator having stator windings wound in fractional pitch winding;
   a rotor rotatably disposed in the stator, said rotor having a rotor core,
   wherein the rotor core is divided into a plurality of division cores provided in an axial direction, each of said division cores having a plurality of magnets and a plurality of magnetic auxiliary salient pole portions formed between poles of the magnets, and
   wherein a magnetic air gap is provided in the axial direction of the rotor in a position shifted in a circumferential direction from a q axis passing through a center of a magnetic auxiliary salient pole within the magnetic auxiliary salient pole portion,
   wherein each of the division cores have its own amount of shifting the magnetic air gap from the q axis in the circumferential direction, and each of the amounts of shifting are set so as to reduce twelfth torque pulsation, which is a part of torque pulsation in energization of the rotor.

2. The rotary electric machine according to claim 1,
   wherein said plurality of the division cores comprises first and second division cores with different said amounts of shifting, and
   wherein a difference of the amounts of shifting between the first division core and second division core is set so as to make the phase difference be 15 degrees in terms of electrical angle between the torque pulsation in energization of the first division core and the torque pulsation in energization of the second division core.

3. The rotary electric machine according to claim 1,
   wherein said plurality of the division cores comprises first, second, and third division cores with different said amounts of shifting, and
   wherein the amounts of shifting of the first, the second, and the third division cores are set respectively so as to make the phase difference be 10 degrees or 20 degrees in terms of electrical angle between the torque pulsation in energization of the first division core and the torque pulsation in energization of the second division core, and between the torque pulsation in energization of the second division core and the torque pulsation in energization of the third division core.

4. The rotary electric machine according to claim 1,
   wherein thicknesses in the axial direction of the respective division cores are substantially the same.

5. The rotary electric machine according to claim 1,
   wherein the magnetic air gap is a concave portion formed at the surface of the rotor core, or a hole formed in the rotor core.

6. The rotary electric machine according to claim 5,
   wherein a circumferential angle of the concave portion is set equal to or less than one half a circumferential angle of an auxiliary salient pole.

7. The rotary electric machine according to claim 1,
   wherein the plurality of magnets each of whose magnetization directions is a radial direction of the rotor core are arranged in the circumferential direction such that the magnetization directions are alternately reversed.

8. The rotary electric machine according to claim 7,
   wherein the respective magnets constitute a magnet group including a plurality of magnets whose magnetization directions are substantially equal.

9. The rotary electric machine according to claim 1,
   wherein the rotor core is formed by laminating electromagnetic steel plates, each plate having a hole or a cutout formed therein for forming the magnetic air gap.

10. The rotary electric machine according to claim 9,
    wherein the two types of magnetic air gaps located in different circumferential positions are formed in the rotor core by laminating one steel plate on another steel plate turned upside down.

11. The rotary electric machine according to claim 1,
    wherein the magnets are shifted in a circumferential direction with respect to their axial position.

12. The rotary electric machine according to claim 1,
    wherein the stator windings are formed by distributed winding.

13. The rotary electric machine according to claim 1,
    further comprises a housing containing the stator, the rotor, and cooling oil,
    wherein apart of the magnetic air gap provided in the rotor core is soaked in the cooling oil.

14. An electric vehicle comprising:
    the rotary electric machine according to claim 1;
    a battery for supplying a direct-current power; and
    a converter for converting the direct-current power of the battery into an alternating-current power, and supplying the alternating-current power to the rotary electric machine,
    wherein the electric vehicle is traveled by a drive force of the rotary electric machine.

* * * * *